(12) United States Patent
Truscott et al.

(10) Patent No.: US 12,524,546 B2
(45) Date of Patent: Jan. 13, 2026

(54) SECURE DATA BACKUP AND RECOVERY FROM CYBERATTACKS

(71) Applicant: Accenture Global Solutions Limited, Dublin (IE)

(72) Inventors: Andrew Truscott, Spring, TX (US); Teresa Sheausan Tung, Tustin, CA (US); Brandon Winful, Fannin, TX (US); Mallikarjun Bepeta, Toronto (CA)

(73) Assignee: Accenture Global Solutions Limited, Dublin (IE)

( * ) Notice: Subject to any disclaimer, the term of this patent is extended or adjusted under 35 U.S.C. 154(b) by 446 days.

(21) Appl. No.: 17/583,172

(22) Filed: Jan. 24, 2022

(65) Prior Publication Data
US 2023/0141909 A1    May 11, 2023

Related U.S. Application Data

(60) Provisional application No. 63/278,028, filed on Nov. 10, 2021.

(51) Int. Cl.
*G06F 21/56* (2013.01)
*G06F 3/06* (2006.01)
*G16H 10/60* (2018.01)

(52) U.S. Cl.
CPC .......... *G06F 21/568* (2013.01); *G06F 3/0619* (2013.01); *G06F 3/065* (2013.01);
(Continued)

(58) Field of Classification Search
CPC .......... G06F 21/55; G06F 21/56; G06F 21/78; G06F 21/554; G06F 21/561;
(Continued)

(56) References Cited

U.S. PATENT DOCUMENTS 8,868,979 B1 * 10/2014 Zhang ................... G06F 21/575
                                                        714/36
10,503,610 B1 * 12/2019 Shemer ............... G06F 11/1464
(Continued)

FOREIGN PATENT DOCUMENTS

IT    202000028874 A1 *  5/2020  ........... G06F 21/568

OTHER PUBLICATIONS

European Patent Office, Communication, Extended European Search Report issued for European Patent Application No. 22206288.7, dated Apr. 4, 2023, 10 pages.
(Continued)

*Primary Examiner* — James N Fiorillo
(74) *Attorney, Agent, or Firm* — Seed Intellectual Property Law Group LLP

(57) ABSTRACT

Aspects of the present disclosure provide systems, methods, and computer-readable storage media that support providing secure backup and recovery of files from edge devices during ransomware attacks or other cyberattacks. Secure data, such as medical records, may be stored at one or more networked storage nodes and backup images (e.g., snapshots) may be stored at a disconnected storage node (e.g., an air-gapped storage node) that is isolated from the networked storage nodes. Application programming interface (API) calls may be managed and monitored to detect an alarm state (e.g., a ransomware attack), and based on the alarm state, storage and retrieval from the networked storage nodes may be stopped. Additionally, a recent backup image from the disconnected storage node may be retrieved for use in performing system recovery operations.

20 Claims, 8 Drawing Sheets

(52) U.S. Cl.
CPC ............ *G06F 3/067* (2013.01); *G06F 21/561* (2013.01); *G06F 2221/033* (2013.01); *G16H 10/60* (2018.01)

(58) Field of Classification Search
CPC .... G06F 21/564; G06F 21/566; G06F 21/568; G06F 21/725; G06F 21/6218; G06F 3/06; G06F 3/065; G06F 3/067; G06F 3/0616; G06F 3/0619; G06F 3/0622; G06F 3/0658; G06F 2221/033; G06F 11/14; G06F 11/0757; G06F 11/1453; G06F 11/1456; G06F 11/1458; G06F 11/1461; G06F 11/1464; G06F 11/1469; G06F 11/1484; G06F 11/3034; G06F 2201/84; G06F 16/1734; G06F 9/45558; G06F 21/552; G16H 10/60; H04L 9/40; H04L 63/02; H04L 63/045; H04L 63/061; H04L 63/101; H04L 63/145; H04L 63/1416; H04L 63/1425; H04L 43/04; H04L 43/062
USPC .......................................................... 726/23
See application file for complete search history.

(56) References Cited

U.S. PATENT DOCUMENTS

| | | | | |
|---|---|---|---|---|
| 10,581,897 | B1* | 3/2020 | Natanzon | G06F 11/0754 |
| 10,983,877 | B1* | 4/2021 | Hoffman | G06F 11/3034 |
| 12,354,043 | B2* | 7/2025 | Saxe | H04L 63/20 |
| 2016/0277374 | A1* | 9/2016 | Reid | H04L 63/0435 |
| 2016/0371500 | A1* | 12/2016 | Huang | G06F 21/6218 |
| 2017/0270293 | A1* | 9/2017 | Gu | G06F 21/566 |
| 2018/0034835 | A1* | 2/2018 | Iwanir | H04L 63/1416 |
| 2018/0181761 | A1* | 6/2018 | Sinha | H04L 63/1433 |
| 2019/0108340 | A1* | 4/2019 | Bedhapudi | G06F 21/554 |
| 2019/0121978 | A1* | 4/2019 | Kraemer | G06F 21/565 |
| 2019/0155695 | A1* | 5/2019 | Protasov | G06F 3/065 |
| 2019/0228148 | A1* | 7/2019 | Pohl | G06F 3/0659 |
| 2020/0099699 | A1* | 3/2020 | Saad | G06F 11/2076 |
| 2020/0213361 | A1* | 7/2020 | Du | H04L 41/22 |
| 2020/0236121 | A1* | 7/2020 | Spurlock | G06F 21/566 |
| 2020/0336508 | A1* | 10/2020 | Srivastava | H04L 63/20 |
| 2021/0067423 | A1* | 3/2021 | Newman | H04L 41/5048 |
| 2021/0264028 | A1* | 8/2021 | Genc | G06F 21/566 |
| 2022/0027471 | A1* | 1/2022 | Levy | G06F 21/6218 |
| 2022/0244858 | A1* | 8/2022 | Grunwald | G06F 11/2094 |
| 2022/0292187 | A1* | 9/2022 | Bhagi | G06F 21/54 |
| 2022/0350887 | A1* | 11/2022 | Kahn | G06F 21/561 |
| 2022/0368613 | A1* | 11/2022 | Darji | G06F 9/5005 |
| 2023/0018773 | A1* | 1/2023 | Sudevalayam | G06F 3/0611 |
| 2023/0078476 | A1* | 3/2023 | Venkatachalam | G06F 21/566 726/24 |
| 2023/0393859 | A1* | 12/2023 | Adogla | G06F 9/5072 |

OTHER PUBLICATIONS

Gonzalez, D. et al. "Detection and Prevention of Crypto-Ransomware," IEEE 8th Annual Ubiquitous Computing, Electronics and Mobile Communication Conference (UEMCON), Oct. 2017, 7 pages.

* cited by examiner

SECURE DATA BACKUP AND RECOVERY FROM CYBERATTACKS

CROSS-REFERENCE TO RELATED APPLICATIONS

The present application claims the benefit of priority from U.S. Provisional Application No. 63/278,028 filed Nov. 10, 2021 and entitled "SECURE DATA BACKUP AND RECOVERY FROM RANSOMWARE ATTACKS," the disclosure of which is incorporated by reference herein in its entirety.

TECHNICAL FIELD

The present disclosure relates generally to providing secure data backup and recovery during cyberattacks. The techniques described herein may leverage application programming interface management and disconnected and isolated storage nodes to enable backup and recovery of data during a ransomware attack or other cyberattack on a system, such as a medical data system.

BACKGROUND

Advances in technology have resulted in an "explosion" of data being generated worldwide. Some researchers have predicted that the amount of digital data in the world has grown by 50% in the last decade (i.e., 2010-2020). This incredible growth has led to many industries relying on structured and unstructured data generation and storage solutions to replace previous physical record keeping. Although transitioning record-keeping from physical, paper records to online, digital records provides many benefits, there are also challenges, such as selecting system(s) for data generation and storage from a large number of diverse offerings, as well as securing online records from attacks. One particular example of an industry that is dealing with the benefits and challenges of digital record keeping is the healthcare industry. Advances in healthcare have resulted in various software and applications being used by different healthcare providers, such that different providers use incompatible systems, data, and processes to maintain medical information. Complex regulatory schemes provide requirements for data security and record keeping for the healthcare industry, further complicating implementation of systems and processes for communicating and storing medical information, such as medical records or other patient information. As digital practices in the healthcare industry continue to come online, healthcare solutions such as telehealth, real-time case reporting, and image file sharing, as well as the continued fracturing between hospitals and individual doctors or specialists, are driving a significant increase in the need to generate, store, and communicate electronic health records amongst enterprises and between different providers. The advent of a common electronic interface for sharing medical records, electronic health record (EHR) data/electronic medical record (EMR) data, has improved medical technology and opened up new possibilities, but challenges remain due to the incompatibility of systems, other data, and processes between healthcare service providers. Medical records typically have tighter requirements than many other types of electronic files. For example, unlike some other types of data, medical records may be encrypted to preserve confidentiality in addition to being used in time-sensitive situations, such as patient care, treatment, surgeries, and the like, in which small reductions in accessibility or access times can have significant consequences.

Another issue with current medical information systems is that these systems are targets for cybersecurity attacks (e.g., malware, viruses, etc.) by malicious actors. One particular type of malware that has gained prominence in recent years is ransomware, a type of malware that encrypts or otherwise renders inaccessible the infected (e.g., corrupted) data until an owner of the data performs some action(s), such as paying a distributor of the ransomware. As an example, in 2021 an insurance company paid a record $40 million to unlock data that had been corrupted in a ransomware attack. Ransomware attacks typically aim to take control of important files in a computing system by cryptographic encryption, with such files including user files in home folders and system files in system folders. Some studies show that, in 2020, ransomware attacks occurred on businesses once every eleven seconds and the number of ransomware attacks increased by as much as 600% from the previous year. As such, ransomware is a fast-growing threat to many types of enterprises, and ransomware attacks can result in significant disruptions to efficiency (e.g., increasing downtime), security, finances, and operations for enterprises or organizations. Additionally, there is no existing software that is capable of unlocking the corrupted files resulting from a malware attack, and there is no guarantee that paying the distributor of the ransomware will result in return of stolen or uncorrupted files. For these reasons, preventing malware attacks is increasingly important for enterprises and organizations.

Ransomware attacks can be especially debilitating for the healthcare industry. For example, time-sensitive and potentially life-threatening surgeries may rely on fast access to medical records, which is prevented during a ransomware attack. Other results of ransomware attacks in the healthcare industry include important processes being slowed or becoming completely inoperable, which may result in a healthcare service provider utilizing pen and paper record keeping, thereby slowing medical processes and using resources that could otherwise be devoted to modernizing or improving computer systems. Because multiple different systems and entities are interconnected in the healthcare industry, there are a variety of first points of attack including service providers (e.g., electronic medical record managers, cloud service providers, human resources, credentialing, revenue cycle, etc.), physicians' or specialists' offices, health insurance payers, billing services, care providers, pharmacies, clinical researchers, connected medical devices and wearable devices, healthcare corporations, and government and regulatory agencies in the healthcare industry. Some specific targets of ransomware attacks include intellectual property, research data, personally identifiable information (PII) or personal health information (PHI) data, financial data, payer information, electronic records, medical device systems, population data, medical claims data, research data, and the like. If experiencing a ransomware attack, a healthcare service provider (e.g., a hospital, doctor's office, specialist, physicians group, etc.) may take systems offline, contact law enforcement to notify them of a breach, collect and secure partial portions of any ransomed data that exists in other storage locations, change passwords and credentials for the system and networks once the systems are taken offline, and attempt to find and delete registry values and files that enable the ransomware attacks. These operations are time consuming, expensive, and often cannot entirely recover the corrupted data. Existing data security techniques, such as data replication and snapshots, may not effectively deal with ransomware attacks or other types of cyberattacks. For example, data replication involves replicating data in real time, which may reproduce the ransomware as part of the replication process. As another example, redundantly storing periodic or timed snapshots (e.g., backup images) of a system may provide a source for recovering or rolling back the system to a time prior to a ransomware attack. However, maintaining multiple snapshots has the disadvantage of using significant disk space and management overhead to maintain a sufficient number of snapshots so that at least one snapshot does not include ransomware (or other malware). As such, existing data security techniques such are costly in terms of computing and storage resources, in addition to being unlikely to uncorrupted system backups in the event of a cyberattack such as a ransomware attack.

SUMMARY

Aspects of the present disclosure provide systems, methods, apparatus, and computer-readable storage media that support secure data backup and retrieval, and system restoration, during situations that would otherwise prevent access to data, such as a ransomware attack or another type of cyberattack. Aspects disclosed herein include monitoring and managing application programming interface (API) calls and using disconnected, isolated data storage at edge devices to enable retrieval of a non-compromised snapshot (e.g., backup) of a system during a ransomware attack, or other cyberattack, that compromises the data processed by the system and stored in any networked storage nodes. To illustrate, a data processing and storage system, such as a health care provider system, may communicate, process, and store secure data (e.g., medical records), and may be configured to provide access to the secure data to various parties and devices. One of the parties may inadvertently be exposed to ransomware (or other malware), which encrypts or otherwise renders inaccessible some or all of the data of the system until particular actions are performed, such as paying a malicious party responsible for distribution of the ransomware. In conventional systems, if the ransomware has compromised data stored in backups at one or more on-premises storage nodes or remote storage nodes that are coupled to the system and accessible via a network, there may not be any non-compromised data from which to restore the system. Unlike such conventional systems, systems of the present disclosure include disconnected storage node(s) that are isolated from the network that connects the system and the other storage nodes. Data duplication may be performed on images of data to be backed up at the networked storage nodes to generate backup images (e.g., snapshots of the system) that are stored at the disconnected storage node using one or more API calls. For example, the disconnected storage node may include or correspond to volumes that are offline and "air-gapped" from the system and the network. As another example, the disconnected storage node may include or correspond to one or more storage nodes of a cloud data service provide that are otherwise isolated from the system and the network. The API calls used to store the backup images at the disconnected node may be one or more industry standard or otherwise "open" (e.g., non-proprietary and available) API calls, such as for one or more APIs configured to process and communicate electronic health record (EHR) data and/or electronic medical record (EMR) data. API management and/or an API gateway of the present disclosure may monitor and validate API calls used to store or retrieve data at the disconnected storage node in order to detect a ransomware attack (or other cyberattack) and to prevent the storage of ransomware-corrupted data at the disconnected storage node. During a ransomware attack, the API management and/or API gateway may prohibit access to the on-premises and networked storage nodes, due to possible corruption, and "promote" the disconnected storage node to provide retrieval of the last good backup image for re-introduction to the system and use in restoring the system with non-corrupted data. In some implementations, the last good backup image (e.g., a most recent backup image/snapshot before the ransomware attack) is provided first to restore the data that was immediately being processed prior to the ransomware attack, and older data is later recovered depending on bandwidth or other factors. Additionally or alternatively, the API management and/or API gateway may generate logs of API calls and system operations during the ransomware attack to be used to analyze and identify the ransomware for possible future protection from similar ransomware, cleaning (or otherwise de-corrupting) the on-premises and networked storage nodes, and the like. Thus, aspects of the present disclosure provide for secure backup of private data, including encrypted data, and the ability to quickly and safely restore a system using non-corrupted backup images, without requiring payment to a distributer of the ransomware distributor or time-consuming and expensive reconstruction of the backed-up data by information technology (IT) and data security professionals.

In a particular aspect, a method for providing secure backup and recovery of files during ransomware attacks or other cyberattacks includes storing, by one or more processors, received data at one or more storage nodes coupled via a network to create a data backup at the one or more storage nodes. The method also includes storing, by the one or more processors, duplicated images of the data backup as backup images at a disconnected storage node that is isolated from the network. The method includes initiating, by the one or more processors and based on detection of target activity, an alarm state corresponding to the data backup. The method also includes issuing, by the one or more processors, one or more application programming interface (API) calls to the disconnected storage node based on the alarm state. The method further includes performing, by the one or more processors, one or more system recovery operations based on a recent backup image received from the disconnected storage node.

In another particular aspect, a system for providing secure backup and recovery of files during ransomware attacks or other cyberattacks includes a memory and one or more processors communicatively coupled to the memory. The one or more processors are configured to initiate storage of received data at one or more storage nodes coupled via a network to create a data backup at the one or more storage nodes. The one or more processors are also configured to initiate storage of duplicated images of the data backup as backup images at a disconnected storage node that is isolated from the network. The one or more processors are configured to initiate, based on detection of target activity, an alarm state corresponding to the data backup. The one or more processors are also configured to issue one or more API calls to the disconnected storage node based on the alarm state. The one or more processors are further configured to perform one or more system recovery operations based on a recent backup image received from the disconnected storage node.

In another particular aspect, a non-transitory computer-readable storage medium stores instructions that, when executed by one or more processors, cause the one or more processors to perform operations for providing secure backup and recovery of files during ransomware attacks or other cyberattacks. The operations include storing received data at one or more storage nodes coupled via a network to create a data backup at the one or more storage nodes. The operations also include storing duplicated images of the data backup as backup images at a disconnected storage node that is isolated from the network. The operations include initiating, based on detection of target activity, an alarm state corresponding to the data backup. The operations also include issuing one or more API calls to the disconnected storage node based on the alarm state. The operations further include performing one or more system recovery operations based on a recent backup image received from the disconnected storage node.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support secure data backup and retrieval, and system restoration, during situations that would otherwise prevent access to data, such as a ransomware attack or another type of cyberattack. Aspects disclosed herein include monitoring and managing application programming interface (API) calls and using disconnected, isolated data storage at edge devices to enable retrieval of a non-compromised snapshot (e.g., backup) of a system during a ransomware attack, or other cyberattack, that compromises the data processed by the system and stored in any networked storage nodes. To illustrate, API calls may be monitored to identify an alarm state (e.g., a ransomware attack) in order to stop storage and retrieval from networked storage nodes and to retrieve a most recent backup image (e.g., snapshot) from a disconnected storage node that is isolated from the networks (e.g., an air-gapped storage node) for performing system recovery operations. Although described in the context of healthcare provider systems and/or medical systems, the aspects of the disclosure may be applied in other contexts that include secure data storage and communication (and optionally are associated with regulatory overhead and oversight) and/or are targets of cyberattacks, such as banking or financial systems, legal service provider systems, government systems, not-for-profit agency systems, or the like.

Figure 1:
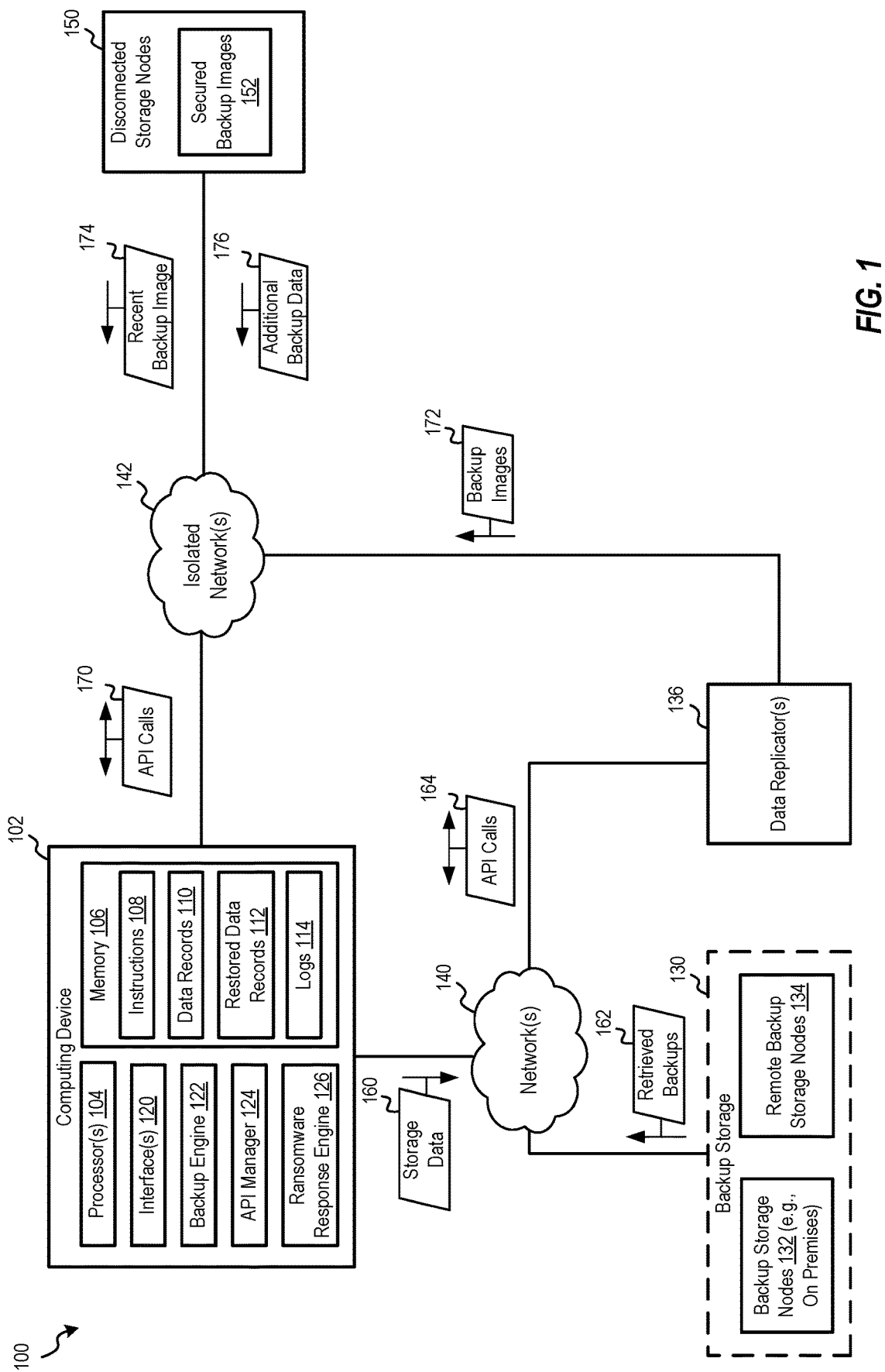
FIG. 1 is a block diagram of an example of a system that supports providing secure backup and recovery of files during ransomware attacks or other cyberattacks according to one or more aspects.

Referring to FIG. 1, an example of a system that supports providing secure backup and recovery of files during ransomware attacks or other cyberattacks according to one or more aspects is shown as a system 100. As shown in FIG. 1, the system 100 includes a computing device 102, backup storage 130, one or more data replicators (referred to herein as "data replicators 136"), disconnected storage nodes 150, one or more networks 140, and one or more isolated networks 142. The backup storage 130 may include backup storage nodes 132 (e.g., on-premises storage nodes), remote backup storage nodes 134, or both. In some implementations, one or more of the backup storage nodes 132, the remote backup storage nodes 134, or the data replicators 136 may be optional, or the system 100 may include additional components, such as additional storage backup storage nodes (e.g., on-premises or remote), additional disconnected storage nodes, client devices, or the like, as non-limiting examples. In some implementations, the system 100 does not include distinct data replicators (e.g., the data replicators 136), and the operations described herein with reference to the data replicators 136 are performed by the computing device 102.

The computing device 102 (e.g., a secure data management device) may include or correspond to a desktop computing device, a laptop computing device, a personal computing device, a tablet computing device, a mobile device (e.g., a smart phone, a tablet, a personal digital assistant (PDA), a wearable device, and the like), a server, a virtual reality (VR) device, an augmented reality (AR) device, an extended reality (XR) device, a vehicle (or a component thereof), an entertainment system, other computing devices, or a combination thereof, as non-limiting examples. The computing device 102 includes one or more processors 104, a memory 106, one or more communication interfaces 120, a backup engine 122, an API manager 124, and a ransomware response engine 126. In some other implementations, one or more of the components 122-126 may be optional, one or more additional components may be included in the computing device 102, or both. It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network, such as the one of the one or more networks 140. To illustrate, one or more operations described herein with reference to the computing device 102 may be performed by one or more servers or a cloud-based system that communicates with one or more storage nodes.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform the operations described herein with respect to the computing device 102, as described in more detail below. Additionally, the memory 106 may be configured to store data and information, such as data records 110, restored data records 112, and logs 114. Illustrative aspects of the data records 110, the restored data records 112, and the logs 114 are described in more detail below.

The one or more communication interfaces 120 may be configured to communicatively couple the computing device 102 to the one or more networks 140 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). The one or more communication interfaces 120 may also be configured to communicatively couple the computing device 102 to the one or more isolated networks 142 via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like). As further described herein, the one or more isolated networks 142 are isolated, either physically or virtually, from the one or more networks 140. In some implementations, the computing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 102.

The backup engine 122 may be configured to initiate, manage, or control backup operations, such as causing the data records 110 (or portions thereof) to be stored at the backup storage 130, causing "snapshots" (e.g., replicated images) of the data backup at the backup storage 130 to be stored at the disconnected storage nodes 150, causing retrieval of backed up data, other backup operations, or a combination thereof. In some implementations, the backup engine 122 may be configured to issue one or more API calls to cause performance of one or more backup operations, as further described herein. The API manager 124 may be configured to manage and monitor API calls to enable performance of backup operations and to detect an alarm state, such as a state indicative of a ransomware attack. Although primarily described herein in the context of ransomware, in other implementations, the API manager 124 may be configured to monitor API calls to detect other types of alarm states, such as cyberattacks, malware attacks, presence of computer viruses, improper network activities by one or more agents of an enterprise, or the like. As used herein, cyberattacks may include introduction of malware (e.g., spyware, ransomware, viruses, worms, trojans, loggers, scrapers, backdoors, etc.), structured query language (SQL) injection, zero-day exploits, or other types of passive or active attacks, either external to or internal to the enterprise.

The ransomware response engine 126 may be configured to respond to a detected alarm state to enable retrieval of non-compromised data and performance of system restore operations (e.g., system recovery operations). For example, the ransomware response engine 126 may initiate retrieval of recent backup images from the disconnected storage nodes 150 for use in performing a system restore at the computing device 102. As another example, the ransomware response engine 126 may be configured to disconnect or otherwise stop (e.g., prohibit) storage and retrieval operations at the backup storage 130 until the alarm state is over and the backup storage 130 has been purged of any ransomware.

The backup storage 130 includes one or more on-premises storage nodes, one or more offsite storage nodes, or a combination thereof, that are communicatively coupled to the computing device 102 via the one or more networks 140. For example, the backup storage 130 may include the backup storage nodes 132 (e.g., one or more on-premises storage nodes), the remote backup storage nodes 134 (e.g., one or more offsite storage nodes), or both. The backup storage nodes 132 and the remote backup storage nodes 134 may include databases, servers, network storage devices, enterprise storage devices, physical storage devices, cloud storage devices, other types of storage devices, or a combination thereof, that are configured to store data, such as data records, files, metadata, and the like, as a backup of the computing device 102 (or the system 100). In some implementations, the stored backup data may include or correspond to one or more backup images (e.g., snapshots) of the computing device 102 or the system 100 at various times. Data may be backed up in the backup storage 130 periodically, responsive to one or more trigger conditions, based on one or more instructions or requests, or in any other manner associated with backup operations.

The data replicators 136 include or correspond to one or more desktop computing devices, one or more laptop computing devices, one or more personal computing devices, one or more tablet computing devices, one or more mobile devices (e.g., smart phones, tablets, PDAs, wearable devices, and the like), one or more servers, one or more VR devices, one or more AR devices, one or more XR devices, one or more vehicles (or components thereof), one or more entertainment systems, other computing devices, or a combination thereof, as non-limiting examples. The data replicators 136 are configured to perform data replication operations based on backups stored at the backup storage 130 (or data being backed up from the computing device 102). For example, the data replicators 136 may be configured to replicate files, data, metadata, and the like to generate one or more backup images (e.g., snapshots) of backups of the computing device 102 or the system 100 that are stored at, or to be stored at, the backup storage 130. In some implementations, the data replicators 136 may be configured to communicate with one or more of the computing device 102, the backup storage nodes 132, the remote backup storage nodes 134, or the disconnected storage nodes 150 via one or more APIs, as further described herein.

The disconnected storage nodes 150 include one or more storage nodes and/or one or more edge computing devices that are communicatively coupled to the computing device 102 and the data replicators 136 via the one or more isolated networks 142 and that are otherwise disconnected and isolated from the one or more networks 140. To illustrate, the disconnected storage nodes 150 may include or correspond to one or more offline storage devices that are not located on-premises (e.g., are offsite or remote), one or more storage devices that are physically separated or disconnected from the one or more networks 140, such as by being located offsite or remote and isolated from any access via the one or more networks 140, one or more storage devices that are virtually separated or disconnected from the one or more networks 140 (e.g., one or more cloud storage locations for which access is controlled via the one or more isolated networks 142 and/or a cloud service provider (CSP)), or a combination thereof. For example, the disconnected storage nodes 150 may include different types of cloud storage (e.g., "hot" storage, "cold" storage, archive storage, network attached storage (NAS), etc.) offered by one or more cloud service providers, databases, servers, network storage devices, enterprise storage devices, physical storage devices, other types of storage devices, or a combination thereof, that are configured to store replicated backup data, such backup images (e.g., snapshots) of the computing device 102 (or the system 100). As such, the one or more isolated networks 142 may function as an air-gap between the disconnected storage nodes 150, the computing device 102, and the data replicators 136, and the disconnected storage nodes 150 may be referred to as air-gap storage nodes. In some implementations, the disconnected storage nodes 150 may be configured to communicate with the computing device 102, the data replicators 136, or both, via one or more APIs, as further described herein.

During operation of the system 100, the computing device 102 may receive, store, manage, process, and/or analyze input data from user input and from other devices to generate and store the data records 110. In some implementations in which the computing device 102 is used by a healthcare service provider, the data records 110 may include or correspond to electronic health record (EHR) data, electronic medical record (EMR) data, or a combination thereof (e.g., EHR/EMR data). For example, a hospital may use the computing device 102 to store patient data, such as records of physicals, diagnosis information, treatment information, identification information, medical history information, insurance information, medical images and scans, results of medical tests, and the like, as the data records 110 in accordance with EHR/EMR standards or formats.

The backup engine 122 may store (or initiate or cause to be stored) the data records 110 (or portions thereof) as part of a backup process performed at the backup storage 130. For example, the backup engine 122 may send storage data 160 that includes the data records 110 (or portions thereof) to the backup storage 130 (e.g., the backup storage nodes 132 and/or the remote backup storage nodes 134) to be stored as backup images. Additionally, the backup engine 122 may retrieve (or initiate retrieval of) retrieved backups 162 from the backup storage 130 (e.g., from the backup storage nodes 132 and/or the remote backup storage nodes 134). The retrieved backups 162 may be received from the backup storage 130 periodically, based on one or more trigger conditions, based on user request or other instructions, or the like, and used for routine or non-routine retrieval of backed up (e.g., archived) data. In some implementations, the computing device 102 may initiate one or more API calls 164 to initiate or cause performance of the backup (e.g., storage) and/or retrieval operations described herein.

The retrieved backups 162 (and/or the storage data 160) may also be used for performing one or more replication operations at the data replicators 136. For example, the data replicators 136 may be configured to replicate images of backups stored at, or to be stored at, the backup storage 130 to generate backup images 172 (e.g., snapshots of the computing device 102 or the system 100 at various times). The backup images 172 may be generated periodically or according to a schedule, based on one or more trigger conditions, responsive to user input or other requests, or the like. In some implementations, the computing device 102 may initiate the replication operations (e.g., to generate the backup images 172) by initiating one or more of the API calls 164. Additionally or alternatively, the data replicators 136 may request the retrieved backups 162, or otherwise communicate with the computing device 102 or the backup storage 130, using one or more API calls of the API calls 164.

In addition to backing up data at the backup storage 130, the backup engine 122 (or the data replicators 136) may initiate or cause storage of the backup images 172 at the disconnected storage nodes 150. For example, the data replicators 136 may provide the backup images 172 to the disconnected storage nodes 150 via the one or more isolated networks 142. The disconnected storage nodes 150 may be configured to the received images (e.g., the backup images 172) as secured backup images 152. In some implementations, the secured backup images 152 may be stored across different volumes or types of storage of the disconnected storage nodes 150 based on receipt times, based on amount of access, based on data sizes or types, other parameters, or a combination thereof. In some implementations, the disconnected storage nodes 150 are temporarily "turned on" or otherwise made accessible via public networks such as the Internet, the one or more networks 140, a LAN, a WAN, or the like, for the duration of receiving the backup images 172, after which they are "turned off" or otherwise returned to an being inaccessible via any publicly accessible networks. As such, the disconnected storage nodes 150 operate as airgapped storage nodes that are otherwise separated and isolated from the one or more networks 140 or other publicly accessible networks, such as the Internet, thereby making the secured backup images 152 inaccessible outside of the disconnected storage nodes 150. As a particular, non-limiting example, the disconnected storage nodes 150 may include cloud storage provided by a CSP that is accessible for storage according to policies provided by the computing device 102.

The API manager 124 may manage APIs, including related API calls, to support backup and storage of data and images (snapshots) at the disconnected storage nodes 150, as well as at the backup storage 130 and communication of data, files, metadata, and the like between components of the system 100. For example, the API manager 124 may manage the API calls 164 between the computing device 102, the backup storage 130, and the data replicators 136, as well as one or more API calls 170 between the computing device 102, the data replicators 136, and the disconnected storage nodes 150. In some implementations, the API are "open" APIs, such as one or more industry standard APIs. Using such APIs may enable interoperability and standardized functionality and support for data communications and backup operations, which may reduce or eliminate time and costs associated with converting data from outside sources to proprietary or other private formats. As non-limiting examples, the APIs may include healthcare industry standard EHR or EMR APIs. In some implementations, the APIs may be configured to support communication of encrypted data (e.g., encrypted EHR/EMR data), storage of encrypted data, or both, to preserve privacy of the data and to comply with one or more regulations or oversight requirements.

The API manager 124 may monitor API calls to detect target activity that triggers an alarm state, such as an alarm state indicative of a ransomware attack (or other malware attack, virus, or security situation). For example, the API manager 124 may monitor the API calls 164 and the API calls 170 (e.g., API calls to store or retrieve data from the backup storage 130 or API calls to store or retrieve backup images from the disconnected storage nodes 150) to detect particular activity (e.g., predetermined activity patterns) that indicate a ransomware attack. As non-limiting examples, the activity patterns may include an expired API call (e.g., an API call having an expired format, an API call to an API that is no longer supported, or the like) or a particular sequence of API calls that is associated with known types of ransomware or previous ransomware attacks. In response to detection of the target activity, the API manager 124 may issue an alarm state for the system 100. The alarm state may indicate to components of the system 100 that a ransomware attack has been detected.

The ransomware response engine 126 issues one or more of the API calls 170 based on the alarm state to cause retrieval of data from the disconnected storage nodes 150 for use in performing system restore operations. For example, the API calls 170 may cause retrieval of a recent backup image 174 from the disconnected storage nodes 150. In some implementations, the recent backup image 174 may represent the most recent state of the system 100 prior to issuance of the alert state (e.g., detection of the ransomware) and may include data or files that were in use, or most likely to be in use, at the computing device 102 prior to the ransomware attack. The recent backup image 174 may be selected from the secured backup images 152 based on timestamps associated with the secured backup images 152, a timestamp associated with the alert state, one or more indicators of a state of the system 100 that are captured at a backup point prior to issuance of the alarm state, or the like. In some implementations, the recent backup image 174 may be a non-encrypted backup image, or a backup image that does not include any data that is encrypted according to a format that is not specified by one or more APIs managed by the API manager 124. After receiving the recent backup image 174, the ransomware response engine 126 may perform one or more system restore operations based on the recent backup image 174. Performance of the one or more system restore operations may generate the restored data records 112 (e.g., non-compromised versions of one or more of the data records 110).

In some implementations, after performing system restore operation(s) based on the recent backup image 174, the ransomware response engine 126 may issue one or more of the API calls 170 to retrieve other data, files, metadata, and the like, to be used to continue the system restore. For example, the disconnected storage nodes 150 may provide additional backup data 176 to the computing device 102 based on the API calls 170. The additional backup data 176 may include older or less recently used or accessed data, files, and metadata that are useful for performing the system restore but that may not be needed to recreate the most recent state of the system 100 prior to the ransomware attack. In this manner, data being used or more frequently accessed may be prioritized for retrieval from the disconnected storage nodes 150 to efficiently perform a system restore of higher priority functionality faster than less important functionality. After receiving the additional backup data 176, the ransomware response engine 126 may perform one or more additional system restore operations based on the additional backup data 176.

Additionally or alternatively, the ransomware response engine 126 may stop access to the backup storage 130 (e.g., the backup storage nodes 132 and the remote backup storage nodes 134) based on issuance of the alert state (e.g., detection of the ransomware attack) by the API manager 124. For example, the ransomware response engine 126 may prohibit access (e.g., storage of data to or retrieval of data from) the backup storage nodes 132 and the remote backup storage nodes 134 for a duration of the alarm state or until the backup storage nodes 132 and the remote backup storage nodes 134 have been cleaned and any trace of the ransomware has been discarded. In some implementations, the ransomware response engine 126 may also prohibit access to the data replicators 136 based on the alert state. The ransomware response engine 126 may also initiate storage of recovered data (e.g., the restored data records 112) at one or more other storage nodes coupled to the one or more networks 140 to create a second data backup at the one or more other storage nodes. For example, one or more redundant or unused storage nodes of the backup storage 130 (or one or more reformatted or otherwise cleaned storage nodes) may be activated or otherwise designated to begin storing backups of the system 100 based on the results of the system restore operations using the data from the disconnected storage nodes 150. This may be referred to as promoting archived data from the disconnected storage nodes 150 to production and play back for the purpose of system recovery (e.g., bringing the system 100 up to date) and starting a new backup.

In some implementations, the ransomware response engine 126 may assist in identifying signatures of ransomware attacks, identifying or filtering future ransomware attacks, analyzing ransomware attacks, and the like. To illustrate, the ransomware response engine 126 may generate and maintain the logs 114 to record or indicate activity during and leading up to the alert state. For example, the logs 114 may indicate identifiers of API calls issued by components of the system 100, sequences of API calls, expired API calls, API calls (or other operations) that are performed and acknowledged or that are rejected and not acknowledged, other types of activities by the components of the system 100, or a combination thereof. The logs 114 may be provided to another device, or to another application or operation of the computing device 102, for analysis to determine information such as an origin of a ransomware attack, network or API call signatures of ransomware attacks, or the like.

As described above, the system 100 supports secure data backup and retrieval, and system restoration (e.g., recovery), during a ransomware attack. To illustrate, the API manager 124 will monitor multiple APIs, such as industry standard APIs, to detect a ransomware attack and, upon detection of the attack, promote the disconnected storage nodes 150 to providing non-compromised (e.g., clean) backup images, such as the recent backup image 174, for use in system restore operations. Thus, the APIs may be used to bring the system 100 up to date (e.g., to the last recorded point before the ransomware attack) in a fast and secure manner. Additionally, the ransomware response engine 126 may stop (e.g., prohibit) access to the backup storage nodes 132 and the remote backup storage nodes 134, preventing anyone in the organization from accidentally recovering infected data until administrators have deleted the infected data. Additionally, by offloading the disconnected storage nodes 150 to cloud storage, the security of air-gapped storage may be achieved without significantly increasing the memory footprint used by on-premises or network devices of the system 100.

Figure 2:
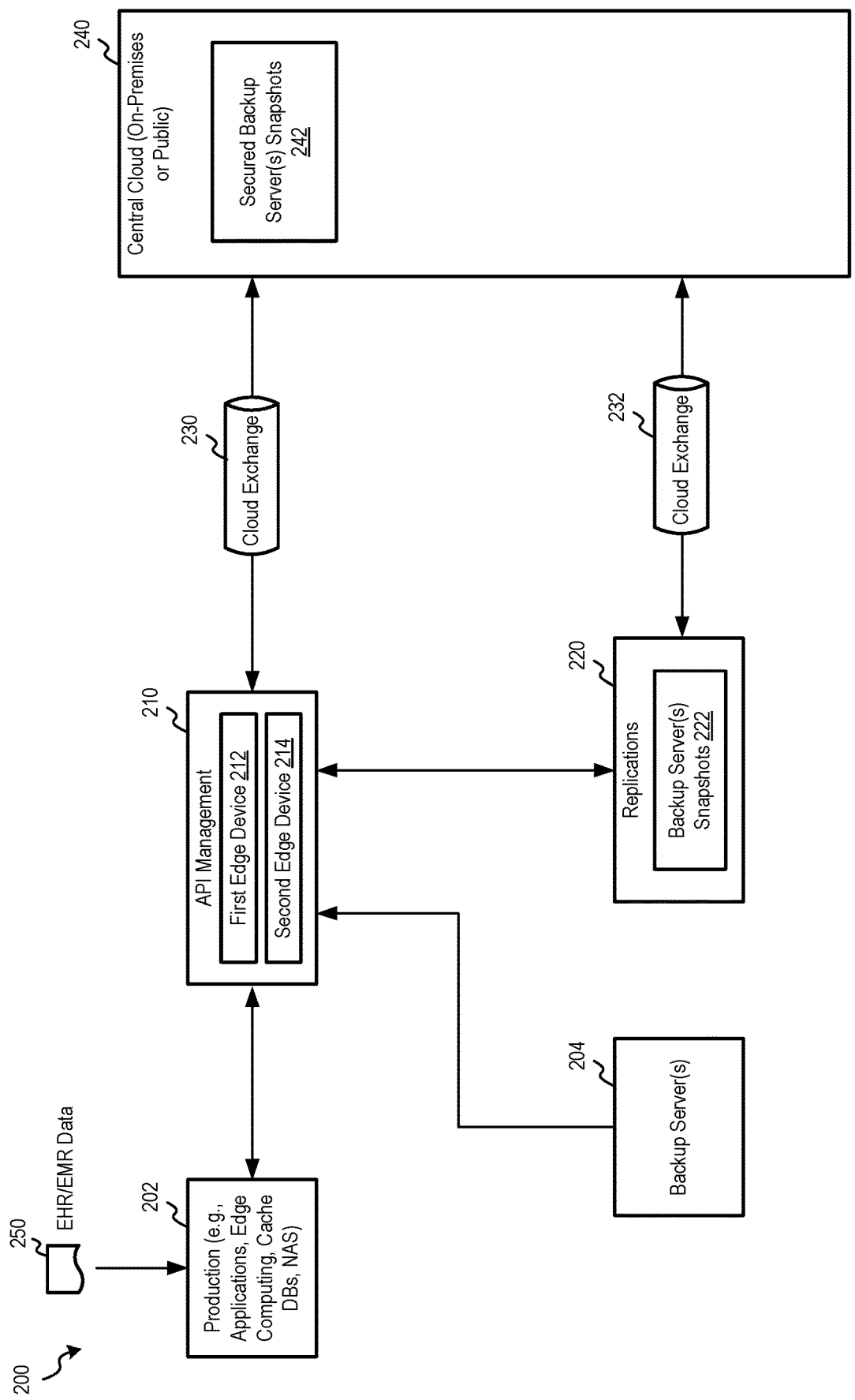
FIG. 2 is a block diagram of an example of a secure healthcare system that provides backup and recovery services during ransomware attacks or other cyberattacks according to one or more aspects.

Referring to FIG. 2, an example of a secure healthcare system that provides backup and recovery services during ransomware attacks or other cyberattacks according to one or more aspects is shown as a system 200. Although described in the context of a healthcare system and medical records, the components and techniques described with reference to FIG. 2 may be applied in other contexts, such as the financial industry, the legal industry, government institutions, or the like, as non-limiting examples. As shown in FIG. 2, the system 200 may include production 202, one or more backup servers 204, API management 210, replications 220, cloud exchange 230, cloud exchange 232, and central cloud 240. In some implementations, the system 200 (or components thereof) may include or correspond to the system 100 (or components thereof) of FIG. 1.

Production 202 (e.g., a production environment) may include or correspond to one or more computing devices executing one or more applications, one or more edge computing devices, one or more cache databases (DBs), one or more network assisted storage (NAS), or a combination thereof, that is configured to receive, generate, store, analyze, and communicate secure data, such as secure medical records or patient information. As a non-limiting example, production 202 may include one or more applications of a hospital computer system that enable patient intake, diagnosis, testing, treatment, and billing. The backup servers 204 may include or correspond to on-premises or remote storage nodes, such as servers, DBs, or the like, that are configured to store files, data, and metadata to as backup images of the system 200. In some implementations, the backup servers 204 may have instant (or near-instant) access and restore capabilities. API management 210 may include one or more applications or processes executed by computing devices to manage API calls to facilitate backup of the system 200 at the backup servers 204 and the central cloud 240, using backup images replicated by replications 220. In some implementations API management 210 may include or correspond to one or more edge computing devices or systems that are distinct from production 202. For example, API management 210 may include at least a first edge device 212 and a second edge device 214. In other implementations, operations described herein with reference to production 202 and API management 210 may be performed by the same devices or systems. In some implementations, API management 210 may be configured to manage one or more open (e.g., publicly accessible) APIs, such as one or more industry standard APIs.

Replications 220 may include one or more data replication processes or applications executed at computing devices, such as devices of production 202, other on-premises devices, edge computing devices, or a combination thereof. Replications 220 may be configured to generate backup images (e.g., snapshots) of the system 200 (e.g., of data and operations of production 202) periodically or at other scheduled times, based on triggering conditions, based on user or system request, or in other manners. For example, replications 220 may generate backup server snapshots 222 for use in backing up the system 200 at the central cloud 240, the backup servers 204, or both. The central cloud 240 may include one or more cloud storage locations of an on-premises cloud deployment or provided by a publicly available CSP. As non-limiting examples, the central cloud 240 may include "hot" storage, "cold" storage, cache storage, archive storage, NAS, tape-based storage, or the like. The central cloud 240 may be communicatively coupled (e.g., connected) to API management 210 via the cloud exchange 230 and to replications 220 via the cloud exchange 232. The cloud exchanges 230, 232 may include or correspond to express routes, direct connections, cloud connections, or the like, that provide access to the central cloud 240 while isolating the central cloud 240 from the other components and networks of the system 200 (e.g., the cloud exchanges 230, 232 may operate as air-gaps for enabling air-gapped storage at the central cloud 240).

During operation of the system 200, production 202 may receive, generate, process, and/or output EHR/EMR data 250. The EHR/EMR data 250 may be generated by one or more applications of a healthcare service provider, and may include or represent reporting, analytics, measurements, notes, and the like. For example, the EHR/EMR data 250 may contain information from clinicians involved in a patient's care and all authorized clinicians involved in a patient's care can access the information to provide care to the patient. EHRs and EMRs are the principle electronic interface most clinicians use today. However, real time and predictive analytics, point of care clinical decision support and analysis which feeds data from a range of sources may not exist within native EHR/EMR standards. Integration of native systems of the health care service provider with the EHR/EMR standards may achieve these features. Data processed and output by production 202 may be backed up at the backup servers 204 and the central cloud 240 via issuing API calls using open APIs, such as industry-standard EHR/EMR APIs.

API management 210 may manage API calls to cause storage of backup images at the backup servers 204 and the central cloud 240. For example, at an initial time, the first edge device 212 may manage API calls and communication and storage of data for use in storing backup images at the backup servers 204 and the central cloud 240. To further illustrate, the backup server snapshots 222 may be provided for storage to the backup servers 204 via one or more networks, and the backup server snapshots 222 may be provided for storage to the central cloud 240 via the cloud exchange 232. This may enable air-gap storage of the backup server snapshots 222 as secured backup server snapshots 242 stored at the central cloud 240. The term 'air gap' used herein may describe volumes are "turned-off" by default and are inaccessible to applications, databases, users, and workloads running on the production environment (e.g., production 202). The backup server snapshots 222 may be stored at the central cloud 240 as images, blobs, or other formats in accordance with one or more open or industry standard APIs. The central cloud 240 (or the secured backup server snapshots 242) may be physically separated from data at production 202 or backed up at the backup servers 204, such that backed-up data, metadata, and indices are archived in isolation from the other components of the system 200 at the central cloud 240. Due to privacy concerns, regulations, and the importance of near instantaneous access, healthcare data is designed to be protected around the clock and it may be desirable to ensure that a backup copy of EHR/EMR data is always remotely stored and disconnected. Using open standards APIs may facilitate storage, updating, and communication with proper security, authentication and authorization, thereby supporting use of the EHR/EMR data across multiple different healthcare organizations. Additionally, using such APIs may offer automated enforcement of healthcare security policies as well as traffic monitoring to flag unexpected activity such as expired or suspiciously sequenced API requests. Standardized EHR/EMR APIs may also simplify movement of data and speed recovery of the EHR/EMR application and data both from on premises locations (e.g., the backup servers 204) and other CSP offerings or on premises cloud storage solutions (e.g., the central cloud 240) that work effectively across the enterprise (e.g., the healthcare service provider).

API management 210 may also monitor the API calls to detect target activity, such as expired API calls or particular sequences of API calls, that indicate a ransomware attack. Upon issuance of an alert state indicating detection of a ransomware attack (or other security event), API management 210 may issue API calls to retrieve a most recent server snapshot of the secured backup server snapshots 242 stored at the central cloud 240 for use in performing one or more system restore operations at the production environment (e.g., production 202). API management 210 may also stop or prohibit access to the backup servers 204. To illustrate, API management 210 may shut down or otherwise cease functionality of the first edge device 212 and any access to the backup servers 204 in addition to retrieving the most recent server snapshot from the central cloud 240 via the cloud exchange 230. Performing the system restore operations may include activating, designating, or the like, the second edge device 214 to enable retrieval of data from the central cloud 240 and, upon restoration, backing up of data using replications 220 and the central cloud 240. Open standard APIs and centralized API management may enable the ability to quickly search across numerous backups jobs to find an unencrypted version of a file for restoration during a ransomware attack. In some implementations, only the files the production environment (e.g., production 202) used most recently (e.g., before the ransomware attack) will be restored first, and after this restoration, older data may be recovered and restored.

As described with reference to FIG. 2, the system 200 implements edge computing, open and industry standard API management, and air-gapped storage to provide secure data backup and system restoration during a ransomware attack to a health services provider system (e.g., the system 200). Edge computing in the healthcare industry may enhance data security, increase bandwidth, and speed up patient data exchange across payers, providers, and other parties, for improved care delivery. Data security is imperative in healthcare services, not only to protect confidential patient information, but also for complying with regulations like those mandated by the Health Insurance Portability and Accountability Act (HIPAA). Moving healthcare data processing to edge computing so that the processing is closer to where the data is generated may improve or optimize network data traffic and increase data transmission efficiency while reducing the size of the ransomware attack, which improves security. Other advantages of edge computing in the healthcare industry include increased bandwidth, which is increasingly important due to the increasing volume of electronic patient data (e.g., EHR/EMR data) and the significant impact of a data breach from ransomware. To support and provide these benefits, aspects of the present disclosure may support APIs that detect ransomware with continuous monitoring by initiating the API calls with the multiple storage devices (e.g., the backup servers 204 and the central cloud 240). If any suspected activity in storage is detected, files may be checked for ransomware files, and if any unexpected encrypted activity is identified through the APIs (e.g., by API management 210), it is confirmed that the system 200 (e.g., production 202) is under the ransomware attack. To resolve the situation, API management 210 may initiate the API calls through an API gateway to build the edge nodes (e.g., the second edge device 214), to restore the last good snapshot and play back the readable and parse-able backed-up records from the central cloud 240 into the production environment. Collected logs during the attack may be sent back to API analytics for future analysis. Additionally, automated enforcement of healthcare security policies may be enforced as well as traffic monitoring to flag unexpected activity such as expired or suspiciously sequenced with API requests. Use of open and industry standard APIs may simplify movement of data and speed recovery of the EHR/EMR application and data from the central cloud 240 that works effectively across the enterprise, as well as providing the ability to quickly search across numerous backups jobs to find an unencrypted version of a file for use in system restoration (e.g., recovery).

In some implementations, API management 210 may be implemented through communication between an API management plane, an API gateway, simple object access protocol (SOAP)/representational state transfer (REST)/Node.js (NODE) edge and storage nodes, and SOAP/REST/NODE recovered systems. In these implementations, the API management plane may identify the Ransomware, validate the authenticity of the alert, and send an access token request to the API Gateway. The API Gateway may perform, validate, and authorizes strong end to end authentication and encryption, such as using open authorization 2.0 (Oauth 2), basic hypertext transfer protocol (HTTP) authentication, in extensible markup language (XML) and JavaScript object notation (JSON) formats, with threat protection and the API gateway may send requests to the SOAP/REST/NODE edge and storage nodes. The API gateway may continuously monitor the traffic flowing through to the API, log transactions, and apply runtime policies. The API gateway may manage and control traffic flows, in addition to authorizing specific data to be recovered. An API request issued by the API gateway may cause identification and validation of a "last good copy" of the data to be recovered in the system.

In some implementations, an API data flow may include API threat detection policies that cause continuous monitoring for any internal and external threats with various security tools. When an incoming alert request is received from the API management plane (e.g., central API monitoring) and reaches the API Gateway, the alert request first undergoes various security checks to ensure that the alert generated is from a malicious ransomware attack and that current system or backup data is corrupted. Then, the API gateway may authorize an API administrator (admin) to ensure the admin is entitled to access the APIs with a proper authentication mechanism, such as a one-way transport layer security (TLS) 1.2 authentication, a client API key validation, or an access token validation, as non-limiting examples. Based on the corresponding requirements, these mechanisms may be applied independently or in combination to authenticate the admin making such API requests. The admin may then be checked for authorization prior to being granted access, such as through a lightweight directory access protocol (LDAP) authentication process. The API gateway may continuously manage and control the storage API traffic with various API policies, such as by imposing quota-based restrictions or by restricting the number of storage API calls an admin can execute. The API gateway may transform API messages (e.g., from or to XML or other formats), format responses received from the backend storage API services to REST formats (e.g., JSON or the like) by utilizing the open, industry standard API gateway policies. The API gateway may continuously perform orchestration, mashup, and message aggregation, which may be used to aggregate responses from multiple back-end storages, and then provide the admin with a consolidated view of stored or retrieved data. In some implementations, the API Gateway may route the request to one or more storage systems at the backend for load balancing. Additionally or alternatively, the API gateway may cache the API calls made to the storage devices to reduce latency and response time. If the caching is implemented, there may be no need to continuously make calls to the storage API backend services; instead the response can be fetched from the cache itself, which may increase the performance of the API calls across the enterprise. API proxies implemented during processing and establishing of communications across the enterprise may encounter numerous issues (e.g., network issues or expired credentials) and such errors in processing the messages may be raised at the corresponding point in time and logged using message logging policies. These logs may then be used for API monitoring and analytics purposes, and centrally captured for analytics. The API gateway web services (e.g., SOAP/REST/NODE) may bring up the edge node responsive to (e.g., as soon as) the alert being triggered from the central API management plane. The APIs may quickly search across numerous backups jobs to find an unencrypted version of a file. In some implementations, at an initial time, only the files the production environment and database were using most recently will be restored, and then older data is later recovered and restored. The APIs that enable the airgap storage may be promoted to the production and play back of archived data, which may automatically identify the last known clean copy (e.g., a most recent backup image) of the backup data up to the point in time when the ransomware attack is detected. Promoting an air gap storage cluster may allow for the playback of the data to bring the system up to date. Backup administrators may then proceed to delete infectious snapshots from other storage nodes, thus preventing anyone in the organization from accidentally recovering data contained within these infected snapshots. At this point, the API central management plane may be updated with the current state and any alerts may be cleared. Additionally, the data (e.g., the logs) may be sent to the API analytics to further investigate and take proactive measures in the future with regard to similar ransomware attacks.

Figure 3:
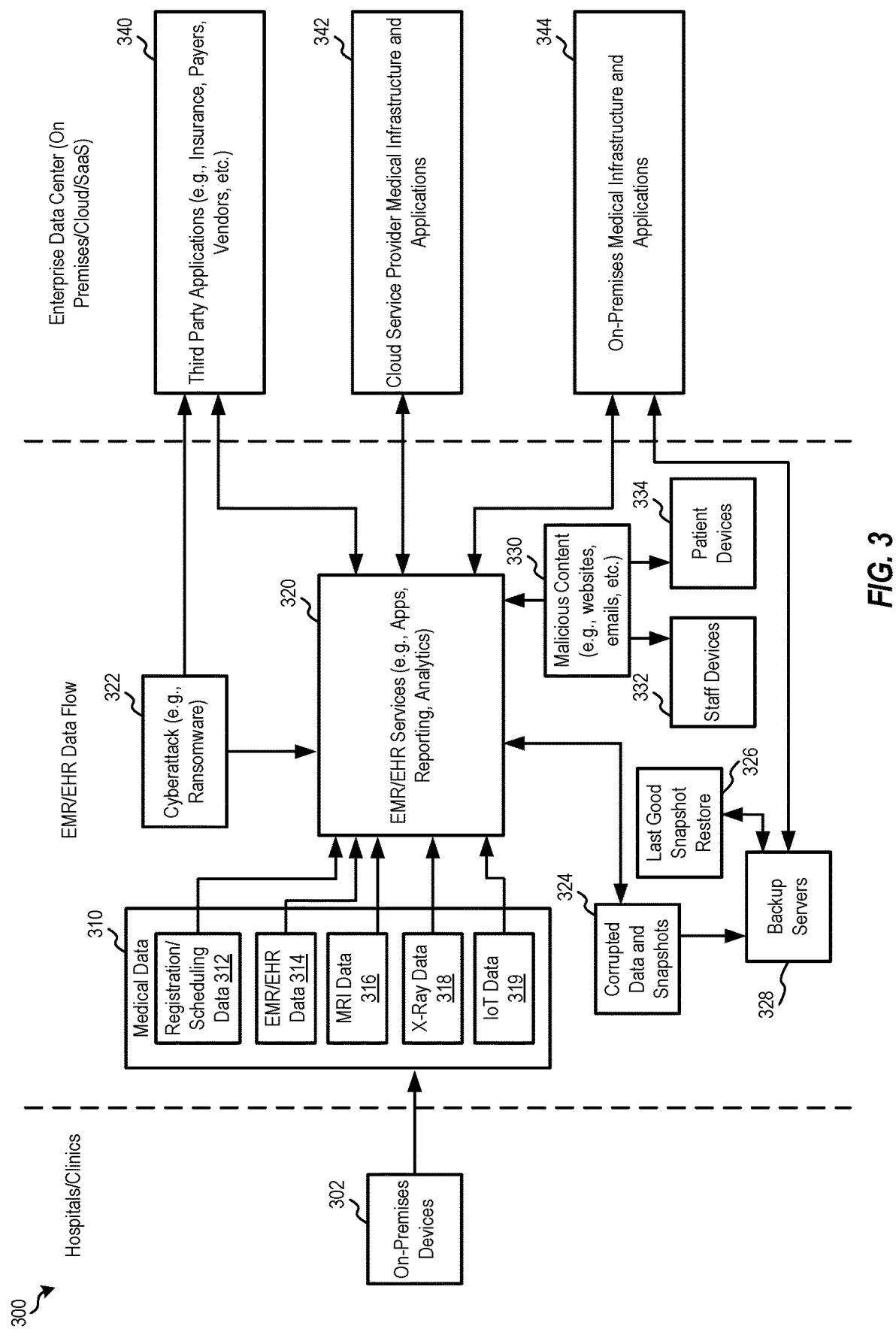
FIG. 3 is a block diagram of an example of data flow through a healthcare computing system that does not support secure backup and recovery at the edge according to one or more aspects.

Referring to FIG. 3, an example of data flow through a healthcare computing system that does not support secure backup and recovery at the edge according to one or more aspects is shown in the context of a system 300. As shown in FIG. 3, the system 300, or data accessed by the system 300, includes on-premises devices 302, medical data 310, EMR/EHR services 320, cyberattack 322, corrupted data and snapshots 324, last good snapshot restore 326, backup servers 328, malicious content 330, staff devices 332, patient devices 334, third party applications 340, CSP medical infrastructure and applications 342, and on-premises medical infrastructure and applications 344. In FIG. 3, various components of the system 300 are shown as being divided between hospitals and clinics (e.g., a medical service provider), EMR/EHR data flow (which may be performed by applications executed by devices on the premises (e.g., at the hospitals or clinics) or from networked or cloud-based resources, and an enterprise data center, which may include one or more on-premises devices or resources, one or more resources or services in the cloud, one or more third-party services or resources, such as software as a service (SaaS), or a combination thereof. The division shown in FIG. 3 is illustrative and may be different in other implementations.

During operation of the system 300, the on-premises devices 302 generate the medical data 310 during day-to-day operations of the hospitals, clinics, or other medical service provider locations. For example, the on-premises devices 302 may include a single or multiple computing devices used to record information during treatment of patients, patient intake, billing, insurance, purchasing of equipment or services, communications with patients, vendors, service providers, or other medical service providers, and the like. In the implementation shown in FIG. 3, the medical data 310 includes registration/scheduling data 312, EMR/EHR data 314, magnetic resonance imaging (MM) data 316, x-ray data 318, and IoT data 319. The registration/scheduling data 312 may indicate registration information associated with patients, schedules for appointments, treatments, procedures, or the like for patients, doctors, and/or technicians, other information that facilitates intake and scheduling of patients or clients, or a combination thereof. The EMR/EHR data 314 may indicate medical records or health records for patients, and may include information input by and accessible multiple different doctors, clinicians, nurses, and/or specialists involved in a patient's care. Because EMR/EHR do not include native real-time and predictive analytics and point-of-care clinical decision support and analysis, medical service provider systems that provide these services integrate with the EMR/EHR standards or risk losing interoperability. The MM data 316 may include MM images taken to diagnose or facilitate treatment of patients, and the x-ray data 318 may include x-ray images taken to diagnose or facilitate treatment of patients. The IoT data 319 may include sensor data generated or captured by one or more IoT sensors or devices, such as temperature data, images or optical data, data from smartwatches or other wearable devices, data from infrared (IR) sensors, or the like. Although the medical data 310 is shown in FIG. 3 as including the registration/scheduling data 312, the EMR/EHR data 314, the MM data 316, the x-ray data 318, and the IoT data 319, in some other implementations one or more of the data 312-319 is optional and/or the medical data 310 may include other types of data used by a medical service provider.

The on-premises devices 302 may provide the medical data 310 for processing to the EMR/EHR services 320. The EMR/EHR services 320 may include applications, reporting services, analytics services, or the like, that are configured to use the medical data 310 to perform operations to analyze, summarize, and report the information indicated by the medical data 310 to support operations of the hospitals and clinics (or other medical service provider). As part of the operations, the EMR/EHR services 320 may provide outputs or receive inputs from the third party applications 340, the CSP medical infrastructure and applications 342, and/or the on-premises medical infrastructure and applications 344. For example, the third party applications 340 may include insurance company applications configured to support insurance validation and authorization operations, the CSP medical infrastructure and applications 342 may include one or more applications or medical services/resources provided by a CSP, and the on-premises medical infrastructure and applications 344 may include one or more applications or medical services/resources supported by systems or devices on the premises (e.g., at the hospitals, clinics, or other medical service provider location). Additionally, the EMR/EHR services 320 may be configured to facilitate backup operations to back up the system 300, such as by generating and storing snapshots at the backup servers 328. The backup servers 328 may provide data for storage at the on-premises medical infrastructure and applications 344 and/or may receive additional data for backing up from the on-premises medical infrastructure and applications 344.

During a cyberattack, the cyberattack 322 may inject malware into the EMR/EHR services 320 and/or the third party applications 340 via one or more direct or passive attacks. For example, the cyberattack 322 may include injecting ransomware into the data inputs to the EMR/EHR services 320. Additionally or alternatively, staff or patients, via the staff devices 332 or the patient devices 334, may inadvertently access the malicious content 330, causing infection of the EMR/EHR services 320. For example, the malicious content 330 may include websites, e-mails, messages, or the like that include malware such as ransomware, viruses, trojans, phishing, or the like, which may spread to the staff devices 332 or the patient devices 334, and from there to the EMR/EHR services 320. The healthcare industry has been an attractive target for hackers for several years, and this attraction has only increased during the recent global pandemic in 2020 and 2021. As hospitals and clinics (e.g., medical service providers) host their medical applications and devices either on-premises (e.g., in house) or via a remote service, such as SaaS, they face challenges including a lack of infrastructure, technical and administrative integration challenges with other medical systems, privacy and security challenges, lack of network security controls (e.g., segmentation and access control across an enterprise), increasing exposure to attacks, lack of testing backup and restoration services, low bandwidth and high latency issues, increased remote access and updates to medical records, and proliferation of malicious content accessed by staff and patients. To illustrate, hospitals may lack the hardware, software, and/or firmware infrastructure to host and update the increased number of medical applications used on a day-to-day basis that host or access patient records. Additionally, technical issues due to APIs fetching and providing data to third parties may stress in house technical staff, especially as the number and administrative overhead associated with the third parties (e.g., payers, insurers, vendors, etc.) increases. Privacy and security issues include compliance with government agencies and regulations, such as Protected Health Information (PHI), Health Insurance Portability and Accountability Act (HIPAA), and Healthcare Interoperability Resources (FHIR), as non-limiting examples. As the number of applications and interfaces increases, the attack surface (e.g., attack exposure) grows, such as due to increasing numbers of vulnerabilities and unpatched software, which may lead to malicious activities (e.g., cyberattacks) that stops or slows the progress of innovations in the medical fields. Additionally, because different vendors host and run their own proprietary hardware, software, and tools to backup medical records, enterprises are unable to test such services prior to use to determine their effectiveness. In addition, the increase in technology has created low bandwidth and high latency issues as data is pulled from multiple different medical applications across the enterprise, as well as increasing the number of remote access attempts, which increases the number of opportunities for a malicious actor to attempt to collect login information or inject malware, and increasing the number of opportunities for doctors, nurses, patients, or the like, to unknowingly be exposed to malicious websites, attachments, phishing emails, links to websites containing ransomware, or other cyberattacks.

After a successful cyberattack (e.g., via the cyberattack 322 and/or the malicious content 330), the data and snapshots processed by the EMR/EHR services 320 may become corrupted. If the cyberattack is a ransomware attack, the corrupted data may be encrypted or otherwise rendered inaccessible. This corruption may spread to the backup servers 328 during the backup process. For example, the corrupted data and snapshots 324 may be provided for storage to the backup servers 328, which may corrupt any or all of the data and/or snapshots stored at the backup servers 328 (and may flow to the on-premises medical infrastructure and applications 344). Alternatively, the last good snapshot restore 326 may remain uncorrupted, but this snapshot may be from a long enough time ago that important information needed for medical procedures is missing from the last good snapshot restore 326. Additionally, the EMR/EHR services 320 may be shut down or isolated to stop receiving data from other systems and integration points, and processing is stopped for all of the systems to deal with the cyberattack. In such a situation, PII data may be compromised and data may be lost that prevents the EMR/EHR services 320 from accessing medical data that is used to make critical decisions in medical treatment and procedures, thereby having a direct negative impact on medical service quality. As such, the medical service provider may be left with the choices of paying the cyber attacker to restore the data, of which there is no guarantee, or undertaking a time consuming and costly data cleanup process that may or may not result in a successful system restore. To prevent (or reduce the likelihood) of such a situation occurring, aspects of the present application support secure backup and recovery even in the event of a cyberattack.

Figure 4:
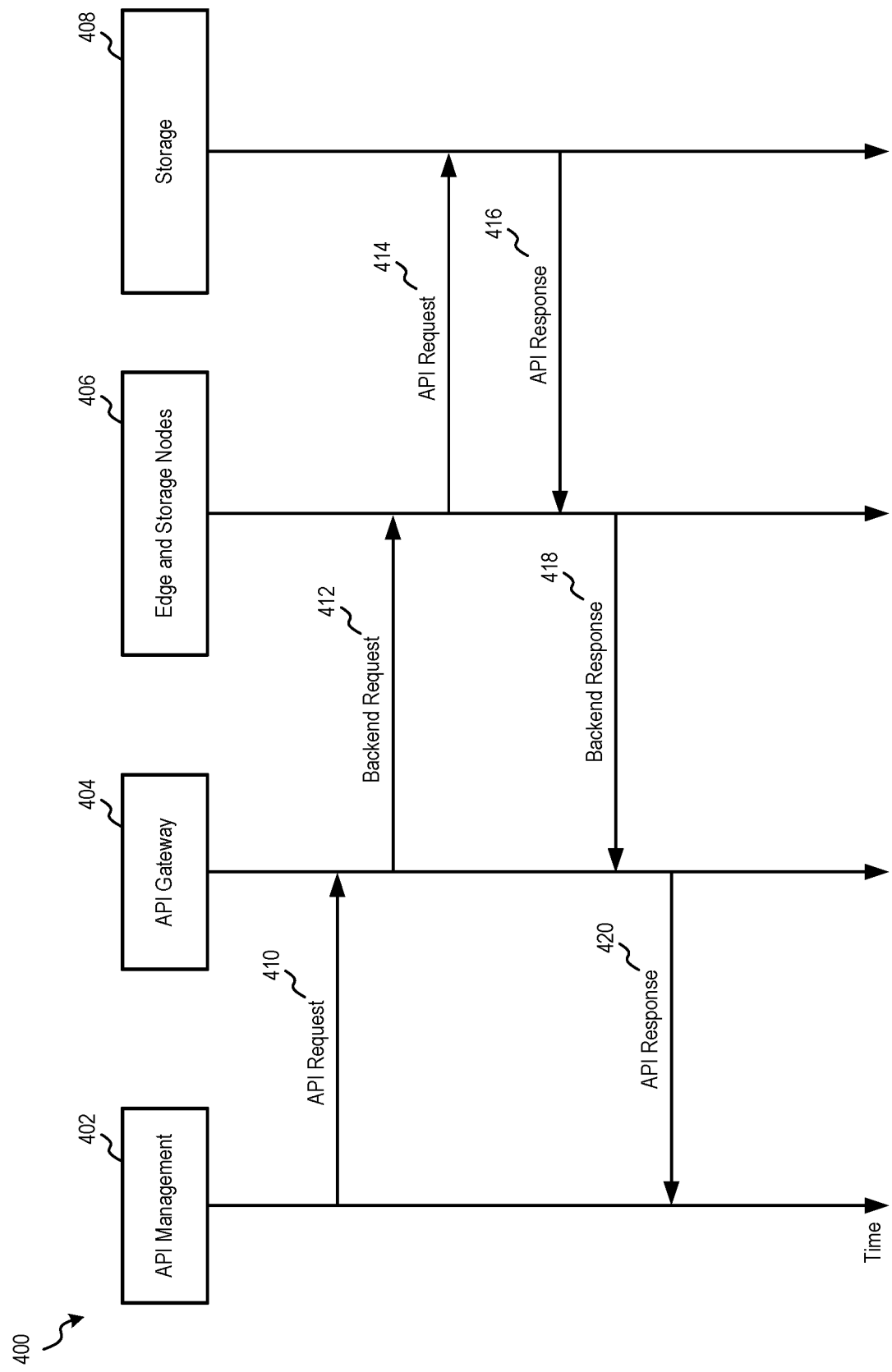
FIG. 4 is a ladder diagram of an example of data flow through a secure backup and recovery system during a cyberattack according to one or more aspects.

FIG. 4 depicts a ladder diagram of an example data flow through a secure backup and recovery system during a cyberattack according to one or more aspects with respect to a method 400. Operations of the method 400 may be performed by one or more of API management 402, API gateway 404, edge and storage nodes 406, and storage 408. The API controlled by the API management 402 and the API gateway 404 may be an API configured to operate in accordance with an open source EMR/EHR standard. In other implementations, the API may be configured to operate in accordance with applications and/or data storage standards in other industries, such as the financial services industry, the legal services industry, education, law enforcement agencies, charities or non-profit agencies, government or regulatory agencies, or the like. In some implementations, one or more of the entities 402-408 may be included in or correspond to the system 100 of FIG. 1 or the system 200 of FIG. 2 (or components thereof), such as the data replicators 136 and the disconnected storage nodes 150 of FIG. 1 or the API management 210 and the replications 220 of FIG. 2, as non-limiting examples.

In the event of an alert indicating detection of a cyberattack, such as a ransomware attack, the API management 402 (e.g., an API management plane) may identify the ransomware attack and validate the alert. A valid alert may indicate that a system backup is to be performed. Responsive to validating the alert, the API management 402 may send an API request to the API gateway 404, at 410, to request recovery of a last good snapshot (e.g., a last known uncorrupted system snapshot or data). In some implementations, the API request includes an access token generated using credentials or other security information accessible to the API management 402. Upon receipt of the API request, the API gateway 404 may validate the API request and send a backend request to the edge and storage nodes 406, at 412. In some implementations, the validation of the API request may include validation and/or authentication of an access token included with the API request. In some implementations, the API gateway 404 may, upon successful validation, authorize strong end to end authentication and encryption between the API management 402 and the API gateway 404 and/or between the API gateway 404 and the edge and storage nodes 406. The authentication and encryption may include Open Authentication 2.0 (OAuth 2), basic hypertext transfer protocol (HTTP) authentication, extensible markup language (XML)-formatted HTTP authentication, Javascript object notation (JSON)-formatted HTTP authentication, or the like, with optional threat protection policies. The edge and storage nodes 406 may receive the backend request and send an API request to the storage 408, at 414, to recover the last good snapshot. For example, the storage 408 may include on-premises storage devices, networked storage devices, or cloud storage that stores system snapshots for use in performing system recovery, and that are isolated (e.g., air gapped) from the system that is being backed up. The API request from the edge and storage nodes 406 may identify the specific snapshot (or other data) that is authorized for recovery, such as via a timestamp or other identifier. In some implementations, the edge and storage nodes 406 and the storage 408 operate according to one or more different protocols, architectures, or APIs than the API controlled by the API management 402 and the API gateway 404, such as Simple Object Access Protocol (SOAP), Representational State Transfer (REST), and/or Node API.

Management for the storage 408 may identify the snapshot or data identified by the API request (e.g., a SOAP/REST/Node API request) and may retrieve and provide the identified snapshot with an API response to edge and storage nodes 406, at 416. The edge and storage nodes 406 may send a backend response that includes the system snapshot (e.g., the last good snapshot) to the API gateway 404, at 418. Upon receipt of the backend response and the system snapshot, the API gateway 404 may validate, authenticate, and/or encrypt the system snapshot according to one or more policies, and the API gateway 404 may send an API response that includes the system snapshot to the API management 402, at 420. The API management 402 may initiate system recovery operations based on the received snapshot (e.g., the last good snapshot). Alternatively, instead of providing the retrieved snapshot to the API gateway 404 and the API management 402 (e.g., with the backend response and the API response, respectively), the edge and storage nodes 406 may perform system recovery by hosting the retrieved snapshot at a previously unused (e.g., new) edge node for production to the system, and the backend response and the API response may identify and provide information associated with the new edge node for use by the system to access the recovered data.

As shown in FIG. 4, the API gateway 404 manages and controls traffic flows through the API and authorizes specific snapshots/data to be recovered using backend requests to the edge and storage nodes 406. Additionally, the API gateway 404 continuously monitors the traffic flowing through the API to log transactions and apply runtime policies. In this manner, when an alert is detected, which indicates a cyberattack, the API gateway 404 may validate the cyberattack according to runtime policies, prevent any unauthorized attempts to store or recover data from the edge and storage nodes 406, authorize retrieval of specific snapshots (or data) for system restoration, and log transactions during an alert period for future reporting and analyzing to prevent or counter the same or similar cyberattacks. Additional details are further described with reference to FIGS. 5-6.

Figure 5:
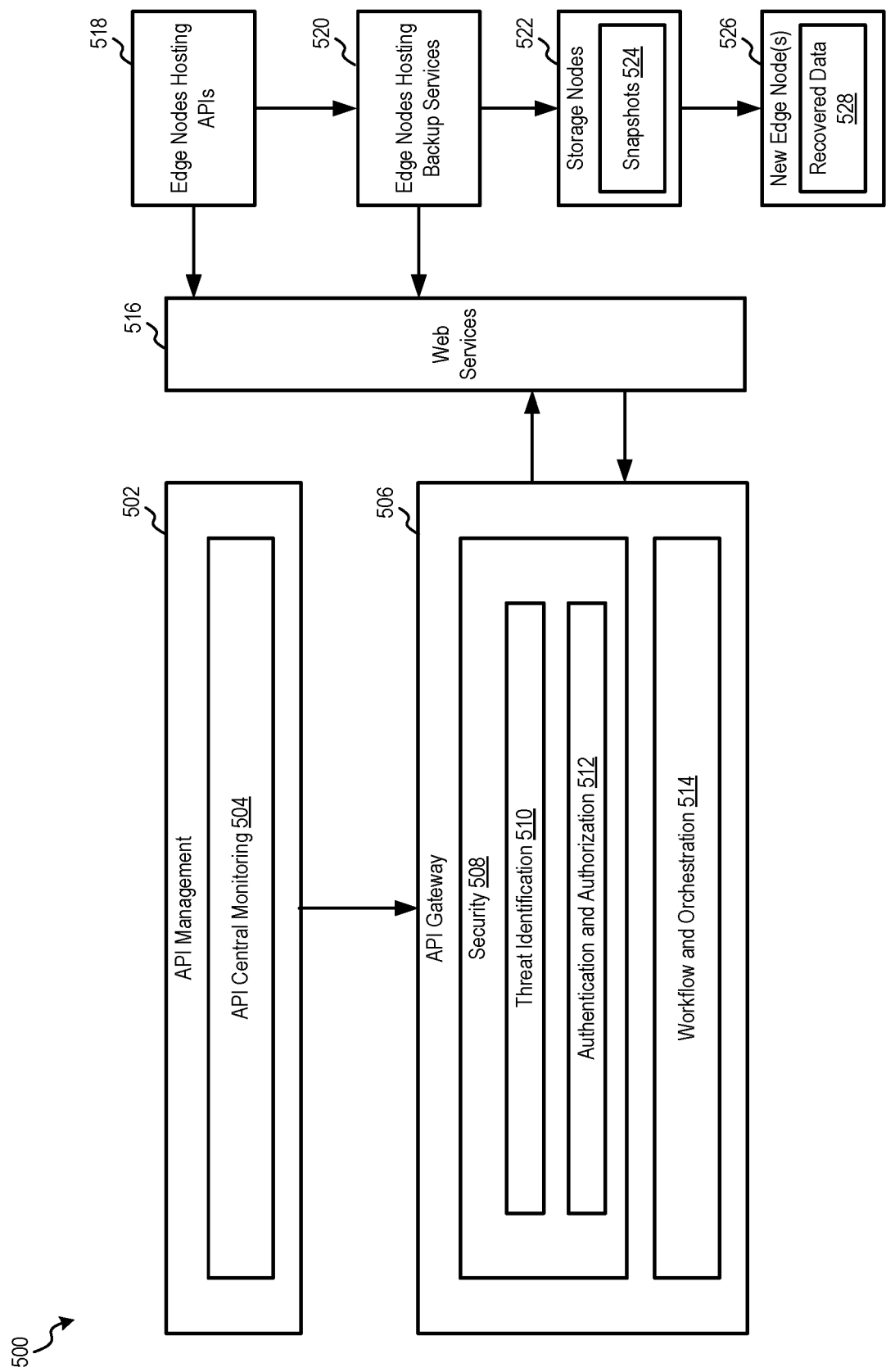
FIG. 5 is a block diagram of an example of application programming interface (API) services and edge storage and recovery services in a secure backup and recovery system according to one or more aspects.

Referring to FIG. 5, an example of API services and edge storage and recovery services in a secure backup and recovery system according to one or more aspects is shown as a system 500. To illustrate, the system 500 may be configured to manage operations with respect to an API used by applications to process secure records or other data, such as an EMR/EHR data, as well as provide secure backup services from edge and storage nodes that are isolated from the systems that generate and process the secure records. In the example of FIG. 5, the system 500 includes API management 502, API gateway 506, web services 516, edge nodes hosting APIs 518, edge nodes hosting backup services 520, storage nodes 522, and one or more new edge nodes 526. In some implementations, one or more of the components of the system 500 may include or correspond to components that perform the method 400 of FIG. 4. For example, the API management 502 may include or correspond to the API management 402, the API gateway 506 may include or correspond to the API gateway 404, the edge nodes hosting APIs 518, the edge nodes hosting backup services 520, the storage nodes 522, and the new edge nodes 526 may include or correspond to the edge and storage nodes 406 and the storage 408.

During operation of the system 500, the API management 502 may monitor traffic flows through the API. For example, the API management 502 may include API central monitoring 504 that is configured to monitor API calls, responses, and other traffic through the API to detect cyberattacks, such as ransomware attacks. For example, as described with reference to FIG. 1, the API calls may be compared to preset API call orderings that correspond to known cyberattacks or likely cyberattacks, and if the API calls match the preset orderings, a cyberattack may be detected. Additionally or alternatively, alerts may be provided by applications, software, services, and the like that interact with the API. In some implementations, the API central monitoring 504 may also manage and monitor one or more API libraries and/or interfaces to support API functionality. After a cyberattack (e.g., a threat) is detected, the API gateway 506 may identify the threat and authenticate and authorize retrieval of a backup snapshot (e.g., backup data) from isolated backup storage. For example, the API gateway 506 may include security 508 that performs one or more security operations. The security 508 may include threat identification 510 that identifies the detected threat, such as a type of cyberattack (e.g., ransomware, other malware, other types of cyberattacks, etc.) or a particular cyberattack (e.g., a particular ransomware, a particular trojan, or the like). For example, the threat identification 510 may identify ransomware threats as different from traffic or probing attacks. In some implementations, the threat identification 510 may perform one or more operations based on the identified threat, such as blocking traffic or probing attacks by filtering and discarding one or more API calls, as a non-limiting example. The security 508 may also include authentication and authorization 512 that authenticates and authorizes API calls to retrieve stored snapshots or other backup data. For example, the authentication and authorization 512 may perform credential management and user level authentication, such as authorizing one or more API calls based on user credentials, device credentials, other access credentials, or the like. Additionally or alternatively, the authentication and authorization 512 may perform audit logging to log one or more API calls during a time period when a threat is detected to use in generating reporting for analysis of the threat at a later time. In some implementations, the authentication and authorization 512 may validate one or more API calls, such as an API call to store backup data or to retrieve a stored snapshot (e.g., backup data). For example, the authentication and authorization 512 may validate data formats of API calls, translate between one or more API formats (e.g., translate from a REST API call to a SOAP or Node API call), perform compression or decompression on transferred data, convert between HTTP and HTTPS, provide custom rule enforcement, or a combination thereof.

In addition to performing security operations, the API gateway 506 may perform one or more workflow and/or orchestration operations to facilitate traffic between the central system (e.g., managed via API traffic) and the backend storage services (e.g., the edge and storage nodes). For example, the API gateway 506 may include workflow and orchestration 514 that orchestrates API traffic and supports workflows. To illustrate, the workflow and orchestration 514 may route traffic between the central system and the backend storage services, aggregate workflows of the backend storage services, perform other orchestration or traffic management operations, or a combination thereof. In some implementations, the workflow and orchestration 514 may perform one or more authentication or authorization operations described with reference to the authentication and authorization 512 and/or one or more validation operations, such as validating data formats of API calls, translating between one or more API formats (e.g., translating from a REST API call to a SOAP or Node API call), compressing or decompressing transferred data, converting between HTTP and HTTPS, providing custom rule enforcement, or a combination thereof. The web services 516 may facilitate one or more communications between the API gateway 506 and the backend storage services.

The edge nodes hosting APIs 518 may host one or more APIs for interfacing between the central system and the backend storage services or between applications of the central system and an EMR/EHR standardized API. The edge nodes hosting backup services 520 may host one or more backup or storage and retrieval services, such as at the storage nodes 522, that are isolated from the central system. In some implementations, the edge nodes hosting backup services 520 may configure the storage nodes 522 as air gapped storage nodes to isolate the storage nodes 522 from networks of the central system. The storage nodes 522 may store snapshots 524 (e.g., data, system state(s), etc.) to back up the central system at various times. For example, the snapshots 524 may be generated by replicating images of the central system at various times. Upon receipt of an API call by the edge nodes hosting backup services 520, the API call may be authenticated and/or validated. If the API call is authenticated and/or validated, the edge nodes hosting backup services 520 may cause the storage nodes 522 to retrieve a last good snapshot of the snapshots 524 for performing a system restore, and the retrieved snapshot may be provided to the new edge nodes 526. The new edge nodes 526 may be put into production using recovered data 528 (based on the retrieved snapshot) to restore the central system without paying an entity that distributed the ransomware/performed the cyberattack, as further described above with reference to FIGS. 1 and 2.

Figure 6:
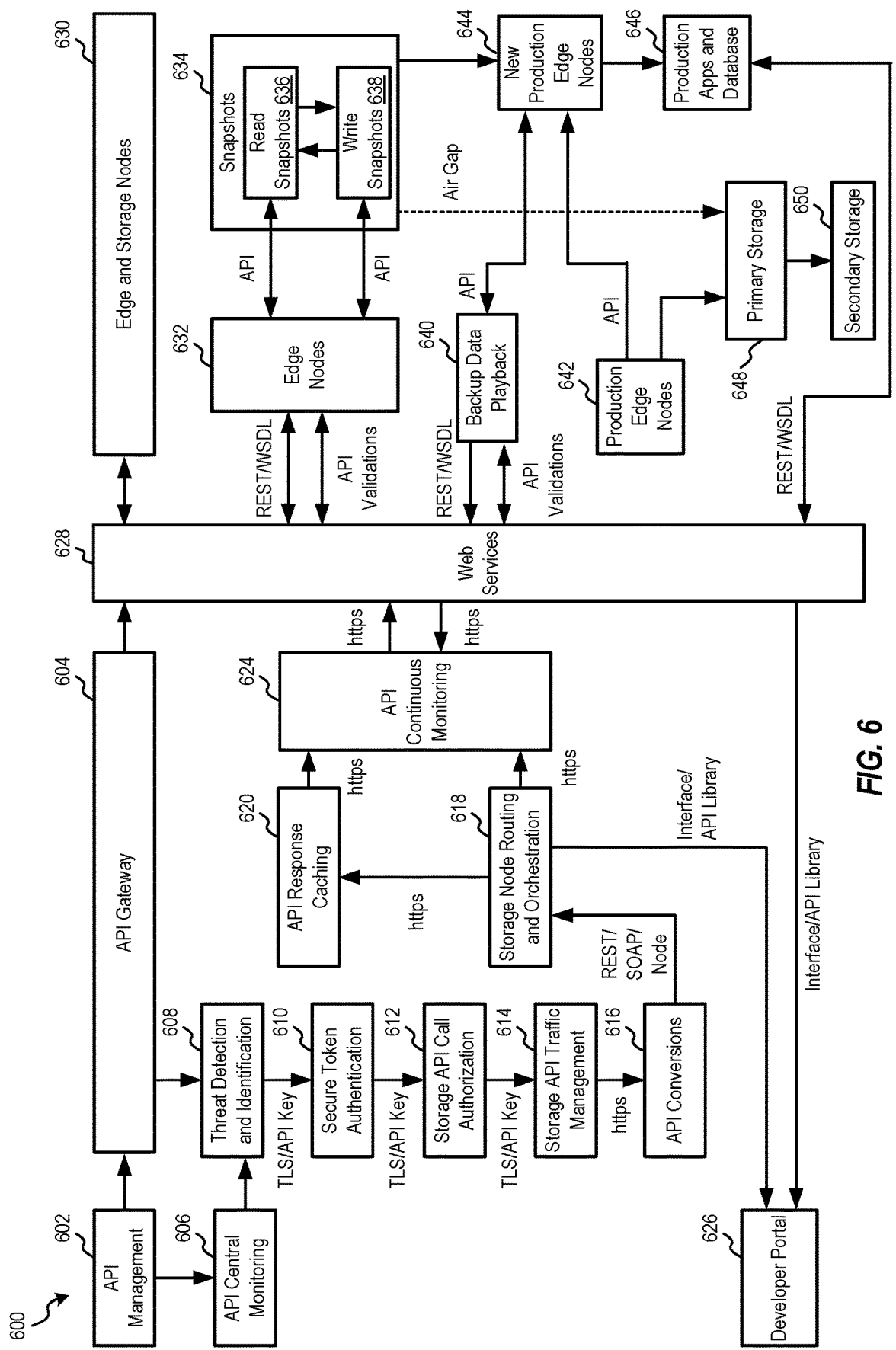
FIG. 6 is a flow diagram illustrating example operations performed by API services and edge storage and recovery services in a secure backup and recovery system according to one or more aspects.

Referring to FIG. 6, example operations performed by API services and edge storage and recovery services in a secure backup and recovery system according to one or more aspects is shown as operations 600. To illustrate, the operations 600 may manage operations with respect to an API (e.g., storage APIs) used by applications to process secure records or other data, such as an EMR/EHR data, as well as provide secure backup services from edge and storage nodes that are isolated from the systems that generate and process the secure records. In the example of FIG. 6, the operations 600 are performed by API management 602, API gateway 604, web services 628, and edge and storage nodes 630. In some implementations, the API management 602, the API gateway 604, the web services 628, and the edge and storage nodes 630 may include or correspond to the API management 502, the API gateway 506, the web services 516, and one or more edge or storage nodes (e.g., one or more of the edge nodes hosting APIs 518, the edge nodes hosting backup services 520, the storage nodes 522, and the new edge nodes 526), respectively, of FIG. 5.

During operation, the API management 602 may perform API central monitoring 606. For example, the API central monitoring 606 may include the API management 602 implementing API threat detection policies that continuously monitor for internal and external threats by comparing ordered API calls to one or more preset API call templates and/or using one or more security tools. Upon detection of a threat, such as a cyberattack (e.g., ransomware attack, malware attack, other type of cyberattack, etc.), the API central monitoring 606 may include initiating an alert by the API management 602 to the API gateway 604. The API gateway 604 may receive the alert and perform threat detection and identification 608 based on the alert. For example, the threat detection and identification 608 may include one or more security checks to ensure that the alert is generated from an actual threat (and not a false positive or non-cyberattack), and that system data is corrupted, such as by a ransomware attack or another type of attack. In some implementations, the security checks may include comparing ordered API calls to one or more preset API call templates, determining that system data is encrypted or otherwise corrupt, or the like.

After a threat is detected and identified, the API gateway 604 may perform secure token authentication 610 to authenticate and/or authorize the API management 602. For example, the secure token authentication 610 may include one or more secure authentication mechanisms that validate that the API management 602 is entitled to access the APIs (e.g., the storage APIs). As non-limiting examples, the secure token authentication 610 may include or correspond to one-way transport layer security (TLS), API key validation, access token validation, or a combination thereof. After the secure token authentication 610 is successful, the API gateway 604 may perform storage API call authorization 612 to check that the API management is authorized to perform storage API calls. For example, the storage API call authorization 612 may include using a lightweight directory access protocol (LDAP) to maintain storage of usernames, identifiers, passwords, or other credentials, and to authorize the API management 602 based on checking credentials provided by the API management 602 against stored credentials.

The API gateway 604 may perform storage API traffic management 614 to manage storage API traffic (e.g., API calls, responses, etc.) between the API management 602 and the edge and storage nodes 630. For example, the storage API traffic management 614 may include continuous monitoring and control of API traffic. Alternatively, the storage API traffic management 614 may include periodic or trigger-based monitoring. In some implementations, the storage API traffic management 614 may be based on one or more API policies set at the API gateway 604. As non-limiting examples, the API policies may include imposing a quota-based traffic policy or a user-specific quantity-based traffic policy. As shown in FIG. 6, one or more of the secure token authentication 610, the storage API call authorization 612, and the storage API traffic management 614 may be performed in accordance with one or more security techniques, such as TLS, API key validation, access token validation, or a combination thereof.

The API gateway 604 may perform API conversions 616 between API messages received from applications accessing the API (i.e., the central system) and API messages received from the edge and storage nodes 630 (i.e., the backend storage API services). To illustrate, the API conversions 616 may include converting a first API message having a first format that is used by the central system (e.g., from an application) to a second API message having a second format that is used by the backend storage API services. Alternatively, the API conversions 616 may include converting a third API message having the second format to a fourth API message having the first format. As non-limiting examples, the first format may include https or XML, and the second format may include REST, SOAP, Node or other JSON formats, or the like. In some implementations, the API conversions 616 may utilize open standard gateway policies.

In addition to identifying threats, authorizing storage API requests, and related operations, the API gateway 604 may perform storage node routing and orchestration 618 to facilitate communications between the central system and the edge and storage nodes 630 and to consolidate the traffic and data being communicated for reporting purposes. For example, the storage node routing and orchestration 618 may include orchestration, mashup, and message aggregation to aggregate responses from multiple backend storage services. These aggregated responses may be used to generate a report that provides a consolidated view of the data and traffic between the central system and the backend storage services. Additionally or alternatively, the storage node routing and orchestration 618 may include routing requests to multiple different edge and storage nodes to perform load balancing for the edge and storage nodes 630. In some implementations, the storage node routing and orchestration 618 may include one or more communications with a developer portal 626. For example, the storage node routing and orchestration 618 may include routing and controlling one or more message flows to support an API library or an interface used by the developer portal 626 to access the storage API.

After the storage node routing and orchestration 618, the API gateway 604 may perform API response caching 620. For example, instead of continuously making calls to the storage API backend services, the API gateway 604 may cache the API calls made to the edge and storage nodes 630 in a cache. A response to the API calls may be stored in and fetched from the cache, obviating the need to make the API calls for each operation. In this manner, performance of the API calls across an enterprise are improved by reducing latency and response time, as compared to individually executing each API call and response in order. The cached responses and the routed messages may be used by the API gateway 604 to perform API continuous monitoring 624. For example, the API gateway 604 may continuously monitor traffic between the central system (e.g., through the API gateway 604) and the edge and storage nodes 630. The monitored traffic may be recorded for reporting purposes, such as for API monitoring and analytics, analysis of cyberattacks, and the like. Additionally or alternatively, any errors or issues in processing messages, such as those due to network problems, expired credentials, and the like, that are identified during the API continuous monitoring 624 may be raised as they are identified and logged using message logging policies, which may result in real-time or near real-time alerts, periodic reporting, or other messaging or reporting. In some implementations, as shown in the example of FIG. 6, the messages provided by the storage node routing and orchestration 618 and the API response caching 620, and those monitored by the API continuous monitoring 624, may be formatted in accordance with one or more internet communication protocols, such as https, XML, web services description language (WSDL), or the like, for communication to the web services 628 (e.g., the REST/SOAP/Node-formatted API calls may be included in https or XML messages).

When an alert is issued by the API management 602 (and validated by the API gateway 604) and a request to retrieve a backup snapshot is issued via the API gateway 604, the web services 628 (e.g., API gateway web services) will operate to facilitate communications to bring up a new edge node to restore the central system. In some implementations, the web services 628 may communicate via messages that are formatted in accordance with https, XML, WSDL, or the like, and that include API calls having a REST, SOAP, or a Node format, or the web services 628 may communicate directly with the edge and storage nodes 630 via messages having a REST, SOAP, or Node format. In some implementations, the edge nodes 632 may also perform one or more API validations to validate received API calls, similar to the operations of the API gateway 604 with respect to messages received from the API management 602. Based on the alert, edge nodes 632 (of the edge and storage nodes 630) may receive messages and/or API calls from the web services 628 and may search for a most recent unencrypted and/or uncorrupted version of a file or snapshot (e.g., system data) used by the central system as snapshots 634. For example, the snapshots 634 may include read snapshots 636 and write snapshots 638 representing snapshots of system information, files, and/or data read from the central system and snapshots of system information, files, and/or data written by the central system for performing system backups, respectively. In some implementations, the edge nodes 632 may identify only a snapshot or portion thereof (e.g., one or more files, data, etc.) that were in use by the central system or databases at a time the cyberattack alert is issued, or a particular size or quantity of snapshots/files/data that were most recently used by the central system, and less recently used data may be recovered at a later time to conserve bandwidth, processing resources, and/or storage capacity at edge nodes and to provide the information that is likely to be the highest priority to the central system. Alternatively, if recovery speed is less important, more or all of the backed up data may be recovered at this time.

Upon identification of a last known clean snapshot (e.g., the most recently used files/data), APIs with airgap connections to isolated backup storage may promote and playback archived snapshots (e.g., data) which may automatically identify the last known clean copy of backup data to the point in time when the cyberattack (e.g., the ransomware attack) occurred or was detected. To illustrate, the edge nodes 632 may be coupled, via an air gap or a virtual air gap, to storage nodes including primary storage 648 and secondary storage 650, either or both of which may be isolated storage nodes (e.g., isolated from network(s) of the central system, such as via air gapping or the like) that store system snapshots for the central system. The snapshots 634 may be retrieved from the primary storage 648 and/or the secondary storage 650 and provided to new edge nodes that were previously not designated for production, referred to herein as new production edge nodes 644. For example, the snapshots 634 may be provided to the new production edge nodes 644 (e.g., an air gap cluster) by the edge nodes 632 or by an air gap link between the new production edge nodes 644 and the primary storage 648, via one or more storage API calls. After the last known clean snapshot is stored at the new production edge nodes 644, the APIs may promote the air gap cluster (e.g., the new production edge nodes 644), which may allow for the playback of the data and a system restore (e.g., bringing the central system up to date). For example, the new production edge nodes 644 may be promoted to production to support backup data playback 640, which may provide the retrieved data (e.g., the read snapshots 634) to the web services 628 for communication to the API management 602 and used to restore the central system. Additionally or alternatively, the new production edge nodes 644 may provide data to production applications and database 646 maintained at the edge and storage nodes 630 for use in supporting an API library or interface at the developer portal 626. As additional data is retrieved from the primary storage 648 and/or the secondary storage 650, the additional data may be communicated to additional edge nodes that are promoted to production and playback, such as production edge nodes 642.

The operations described with reference to FIG. 6 may be performed to restore the central system in the event of a cyberattack, such as a ransomware attack. During the time period of the cyberattack, databases and storage devices of the central system may be disconnected or shut down to prevent additional spread of corrupted or encrypted data. As the cyberattack is addressed by the enterprise, backup administrators or other cyber security personnel may proceed to delete infected snapshots, thereby preventing anyone in the enterprise from accidentally recovering data contained within infected snapshots. These infect snapshots do not make their way to the edge and storage nodes 630, due to the monitoring, authentication, authorization, and validation operations performed on API calls by the API management 602 and the API gateway 604. When the backup data playback 640 is initialized and accessible to the API management 602, the API management 602 may be updated with the current state, and any alerts may be cleared. Results of the API continuous monitoring 624, and any other data related to the cyberattack, may be aggregated, reported, and/or stored for use by API analytics to further investigate the cyberattack and take proactive measures to prevent the same or similar cyberattacks in the future.

Figure 7:
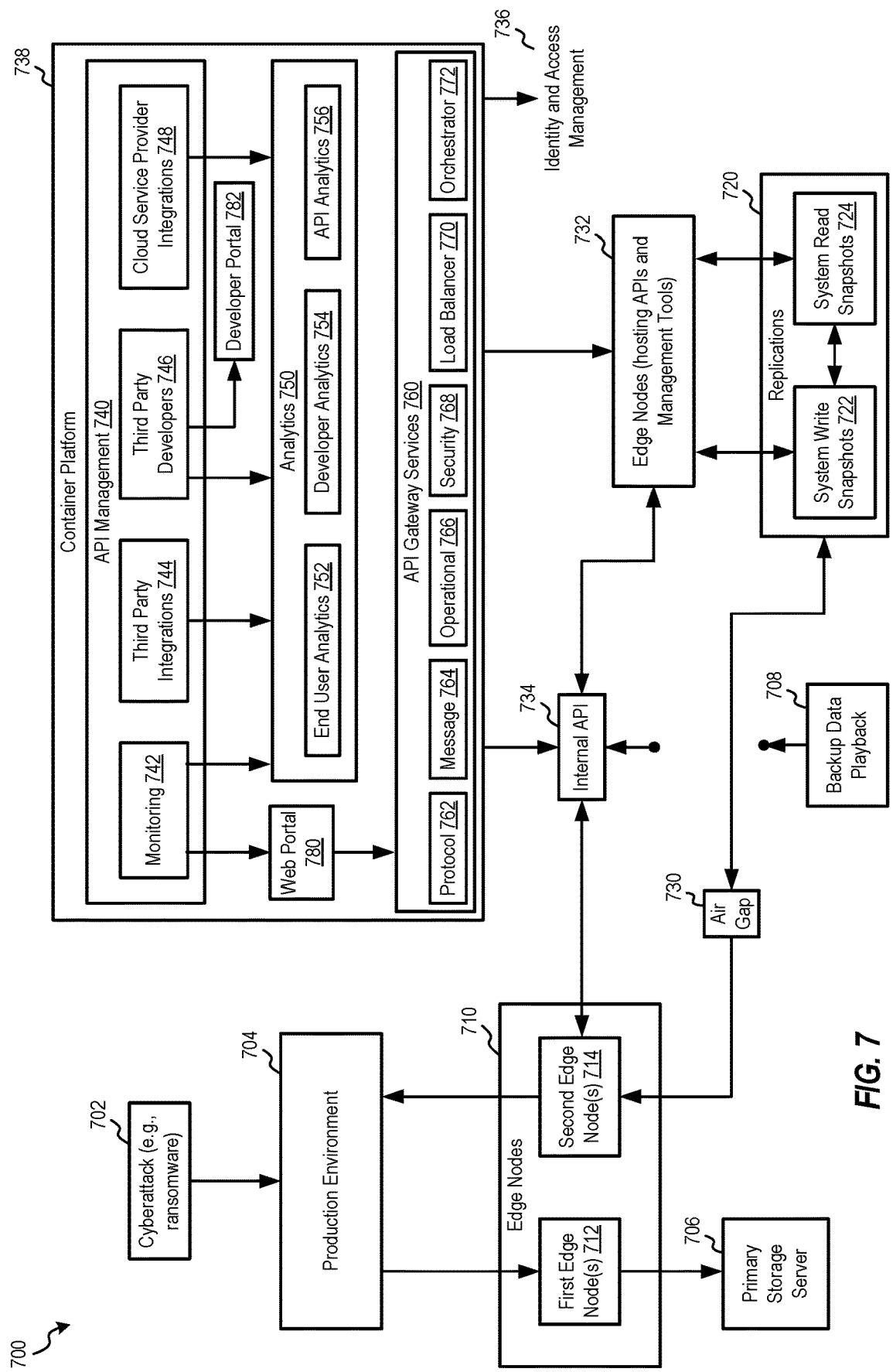
FIG. 7 is a block diagram of an example of data flow through a secure backup and recovery system during ransomware attacks or other cyberattacks according to one or more aspects.

Referring to FIG. 7, an example of data flow through a secure backup and recovery system during ransomware attacks or other cyberattacks according to one or more aspects is shown in the context of a system 700. In the example shown in FIG. 7, the system 700 includes cyberattack 702, production environment 704, primary storage server 706, backup data playback 708, edge nodes 710, replications 720, air gap 730, edge nodes 732, internal API 734, identity and access management 736, and container platform 738. In some implementations, the system 700 may include or correspond to the system 100 of FIG. 1, the system 200 of FIG. 2, or the system 500 of FIG. 5 (or components thereof), and operations performed by the system 700 may include or correspond to one or more of the operations 600 of FIG. 6.

The container platform 738 may operate as an appliance of the API, and may be configured to communicate with the internal API 734, the edge nodes 732, and the identity and access management 736. For example, the container platform 738 may provide API management and gateway functionality, as described above with reference to FIGS. 4-6. In the implementations shown in FIG. 7, the container platform 738 (e.g., an API container platform) may include API management 740, analytics 750, API gateway services 760, a web portal 780, and a developer portal 782. The API management 740 may be configured to manage how APIs are versioned and published for consumption, as well as the way APIs are deprecated, and additionally to manage the life cycle of the APIs, including change, availability, and release notifications. The API management 740 may include monitoring 742, third party integrations 744, third party developers 746, and cloud service provider integrations 748. The monitoring 742 may be configured to monitor API calls and alerts from the production environment 704. The third party integrations 744, the third party developers 746, and the cloud service provider integrations 748 may provide integrations with third party tools and cloud service provider tools as well as supporting interfaces or API libraries for developers via the developer portal 782.

The analytics 750 may include or correspond to one or more tools that provide insight into the consumption of APIs and their processing, including information that identifies API behavioral patterns that could be deemed as a cyberattack. The analytics 750 may include end user analytics 752, developer analytics 754, and API analytics 756. The end user analytics 752 may include or support one or more analytics tools that analyze end user activity corresponding to API communications. The developer analytics 754 may include or support one or more analytics tools that analyze third party developments that utilize the API. The API analytics 756 may include or support one or more analytics tools that analyze the operations facilitated by the API itself. The API gateway services 760 may include protocol service 762, message service 764, operational service 766, security service 768, load balancer service 770, and orchestration service 772, which are configured to perform the operations similar to those described above with reference to the API gateway 604 of FIG. 6. The protocol service 762 may include policies for the translation of protocols between incoming requests and storage backend services. The message service 764 may include policies for performing message translation between different message formats and data models at the backend with the storage nodes. The operational services 766 may include policies for logging, monitoring, and alerting, and in some implementations, a suite of enterprise tools. The security service 768 may include various security and enforcement policies for authentication, authorization, threat detection, and traffic management. The load balancer service 770 may include polices for load balancing between multiple edge nodes and/or storage nodes. The orchestration service 772 may include policies for routing, orchestration, mashups, and message aggregation with a minimal number of API calls with the backend storage services. The web portal 780 may support communication between the API management 740 and the API gateway services 760 and the edge nodes 732, such as by converting messages from https, XML, or WSDL to REST, SOAP, or Node formats, as non-limiting examples, for communication via the Internet or other networks. The API gateway services 760 may access the identity and access management 736 to authorize, authenticate, or validate API calls or users/devices from which the API calls originate, as described above with reference to FIG. 6.

During operation of the system 700, the cyberattack 702 may occur at the production environment 704, such as introduction of ransomware into the production environment 704. The ransomware, or other malware, may infect not only data being processed by the production environment 704, but also data stored at the primary storage server 706 and at one or more of the edge nodes 710, such as first edge nodes 712 (e.g., one or more edge nodes configured to maintain backup snapshots of the production environment 704 at the primary storage server 706). Traditionally, important and confidential data, such as EHR/EMR data, has been protected by creating a copy (e.g., a backup) of primary data and storing it in an offsite location that is not connected to network(s), such as the primary storage server 706. Such traditional techniques fail to protect against ransomware and other newer cyberattacks. Ransomware, unlike other forms of disasters to enterprises, often attacks a specific enterprise via unpredictable and multiple vulnerable points. Although primary storage may be moved to a location that is less likely to experience natural disasters or other geographically related disturbances, ransomware can reach any geography. Unlike some cyberattacks, ransomware attacks snapshots and data protection storage areas. In addition, some ransomware variants start by encrypting backup copies and configuration files first. This technique of delayed corruption of data results in corrupt files within multiple backups, often before the attack is detected.

Technology teams are more important to enterprises than ever as they maintain systems under increasing demand and expedite digital innovations. Such accelerated technological transformations are supported by APIs that enable fast digital connections for information sharing and new solutions. Aspects described herein leverage combinations of snapshot storage and open API calls to enable faster system recovery with minimal or no data loss from ransomware and other cyberattacks, particularly by focusing on prevention of cyberattacks on backup data. To illustrate, responsive to detection of the cyberattack 702, the central system (e.g., the production environment 704, the first edge nodes 712, and the primary storage server 706) is taken offline to prevent spread of corrupted data. Meanwhile, a new system is initiated (e.g., "new system stand up") to provide production of backed up data as close to the point in time the cyberattack 702 is detected for use by the production environment 704 as quickly as possible, thereby preventing disturbances to any activities supported by the production environment 704, such as critical medical procedures (e.g., surgeries, treatments, at the like).

To restore the system, second edge nodes 714 (e.g., one or more new edge nodes not previously assigned to production) may access the internal API 734 to search for a last good snapshot that is stored in isolated storage nodes. The internal API 734 may be an open standards API, such as an EHR/EMR API, that is designed to provide standardized implementation and functionality for secure records storage. API overhead (e.g., the container platform 738) may monitor and control API calls to the edge nodes 732, which host the APIs and management tools, in addition to storage API backend services. For example, the edge nodes 732 may manage and facilitate the generation, storage, and retrieval of the replications 720 at one or more storage nodes isolated from the networks of the central system. In some implementations, the replications 720 may include system write snapshots 722 and system read snapshots 724, as described above with reference to FIG. 6. The last known good snapshot may be identified within the replications 720 stored at the storage nodes, and upon validation of the API calls and the stored data/database/storage nodes, the last known good snapshot may be designated as the backup data playback 708. The backup data playback 708 (i.e., the storage node(s) storing the last known good snapshot of the replications 720) may be isolated from the edge nodes 710 by the air gap 730. Upon successful validation, the backup data playback 708 (e.g., the air gapped cluster) and the air gap 730 may be promoted to production to the second edge nodes 714 to get more storage. The air gap 730 is used to describe volumes that are "turned off" by default and are inaccessible to applications, databases, users, and workloads running on the production environment 704. Air-gapped data storage becomes accessible when it is "turned on," and prior to this a copy of the data is kept in a location that cannot be accessed without being physically present, thereby preventing malicious entities from attacking the stored data over the network.

Use of open standards APIs, which are regularly updated, may provide for proper security, authentication, and authorization of calls to store or retrieve secured EHR/EMR data for an enterprise, such as a healthcare organization. Automated enforcement of healthcare security policies, as well as traffic monitoring, may be performed by the container platform 738 to flag any unexpected activity that is indicative of a ransomware threat, such as expired credentials or suspiciously sequenced API calls. The use of open standards APIs may also simplify the movement of data and the recovery speed of EHR/EMR applications and data across an enterprise, including at on premises storage and storage provided by a CSP. Immutable backups as described herein may ensure that secure data is always encrypted, and open standard API integrations may cause data to be encrypted in flight and at rest, regardless of backup service provider, and to be controlled with an encryption key with continuous monitoring. Backup images (e.g., snapshots) are air gapped from central systems (e.g., infrastructure) and are unable to be attacked by ransomware in the production environment 704. As described above, if a cyberattack (e.g., ransomware) is detected, the open standards APIs running at the edge nodes 732 may continuously monitor, via the container platform 738, for presence of the cyberattack and through the air gap 730 promote to production the backup data playback 708 to restore data up to the point of the cyberattack. In some implementations, the open standard APIs and centralized management may provide the ability to quickly search across numerous backup jobs to find an unencrypted version of a file, as well as to quickly restore the most recently used files, leaving other files to be restored later, as bandwidth and processing resources permit.

After the air gap 730 is turned on and the backup data playback 708 is promoted, the second edge nodes 714 and/or the container platform 738 may perform additional validations (e.g., revalidations) to check the new storage, and upon success, the retrieved data (e.g., the last known good snapshot) may be provided to the production environment 704, also referred to as replaying the delta data into the production environment 704. One or more additional validation operations may be performed to complete at least a first portion of the system restore, after which the production environment 704 has access to the most recently used data (e.g., from the last known good snapshot). This data may include system files, configuration files, and other files or information for supporting the production environment 704, in addition to recently accessed or generated data from one or more applications of the production environment 704. As system restoration progresses, older data may be retrieved from the replications 720 and the associated air gapped storage nodes may be promoted to production to provide a remainder of the backed up data to the production environment 704. During or after the system restoration, backup administrators may proceed to delete infectious snapshots to prevent anyone in the enterprise from recovering corrupted data.

Thus, the system 700 enables archiving of data to an isolated storage location, such as cloud storage, through open standards APIs. With incremental archiving of EHR/EMR data with source side de-duplication and compression may significantly reduce network bandwidth usage to perform the archiving. Additionally, the combination of archival with open standards APIs creates a self-contained copy of the backup stored in the cloud, the backup including backed up data, metadata, and index. In the event of a ransomware or other cyberattack, the source cluster may be disconnected and EHR/EMR data may be retrieved using the APIs to a new edge node, thus providing additional layers of protection as compared to other backup services.

Figure 8:
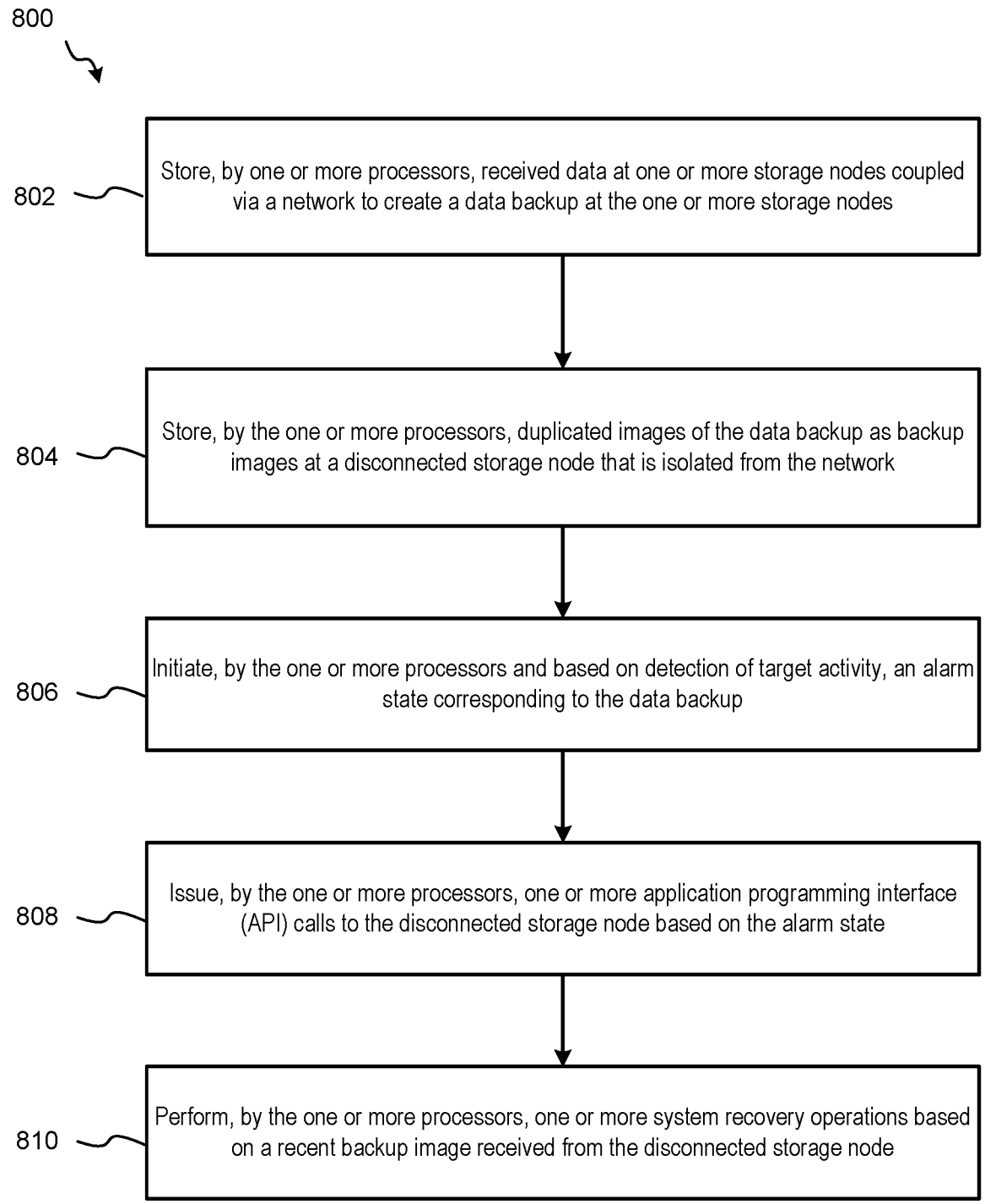
FIG. 8 is a flow diagram illustrating an example of a method for providing secure backup and recovery of files during ransomware attacks or other cyberattacks according to one or more aspects.

Referring to FIG. 8, a flow diagram of an example of a method for providing secure backup and recovery of files during ransomware attacks or other cyberattacks according to one or more aspects is shown as a method 800. In some implementations, the operations of the method 800 may be stored as instructions that, when executed by one or more processors (e.g., the one or more processors of a computing device or a server), cause the one or more processors to perform the operations of the method 800. In some implementations, the method 800 may be performed by a computing device, such as the computing device 102 of FIG. 1 (e.g., a computing device configured for maintaining medical records or other secure data), the API management 210 of FIG. 2, or a combination thereof.

The method 800 includes storing received data at one or more storage nodes coupled via a network to create a data backup at the one or more storage nodes, at 802. For example, the received data may include or correspond to the data records 110 of FIG. 1, the one or more storage nodes may include or correspond to the backup storage 130 of FIG. 1 (e.g., the backup storage nodes 132, the remote backup storage nodes 134, or both), and the network may include or correspond to the one or more networks 140 of FIG. 1. In some implementations, the received data includes EHR/EMR data. The method 800 includes storing duplicated images of the data backup as backup images at a disconnected storage node that is isolated from the network, at 804. For example, the backup images may include or correspond to the backup images 172 of FIG. 1, and the disconnected storage node may include or correspond to the disconnected storage nodes 150 of FIG. 1. In some implementations, the disconnected storage node may include an on-premises storage node that is isolated from the network or a cloud-based storage node that is disconnected from the network.

The method 800 includes initiating, based on detection of target activity, an alarm state corresponding to the data backup, at 806. For example, the alarm state may include or correspond to an alarm state issued by the API manager 124 of FIG. 1. In some implementations, the target activity may be detected based on monitoring API calls to store or retrieve data from the data backup, API calls to store or retrieve the backup images from the disconnected storage node, or a combination thereof. For example, the API calls may include or correspond to the API calls 164, the API calls 170, or both, of FIG. 1. The target activity may include an expired API call or a particular sequence of API calls that correspond to a ransomware attack, as non-limiting examples.

The method 800 includes issuing one or more API calls to the disconnected storage node based on the alarm state, at 808. For example, the one or more API calls may include or correspond to the API calls 170 of FIG. 1. The method 800 includes performing one or more system recovery operations based on a recent backup image received from the disconnected storage node, at 810. For example, the recent backup image may include or correspond to the recent backup image 174 of FIG. 1.

In some implementations, the method 800 also includes receiving, after receipt of the recent backup image, additional backup data from the disconnected storage node and performing one or more additional system recovery operations based on the additional backup data. For example, the additional backup data may include or correspond to the additional backup data 176 of FIG. 1. Additionally or alternatively, the method 800 may include generating one or more logs of system activity during the alarm state and providing the one or more logs for analysis after termination of the alarm state. For example, the one or more logs may include or correspond to the logs 114 of FIG. 1. Additionally or alternatively, the method 800 may include prohibiting access to the data backup at the one or more storage nodes based on the alarm state and initiating storage of recovered data at one or more other storage nodes coupled via the network to create a second data backup at the one or more other storage nodes. For example, the ransomware response engine 126 of FIG. 1 may prohibit (e.g., stop) communications with the backup storage 130 (e.g., the backup storage nodes 132 and the remote backup storage nodes 134), the data replicators 136, or both, until the ransomware is purged from the system 100.

As described above, the method 800 supports secure data backup and retrieval, and system restoration (e.g., recovery), during a ransomware attack. To illustrate, API calls of various APIs, such as industry standard APIs, may be monitored to detect a ransomware attack and, upon detection of the attack, promote the disconnected storage node to providing non-compromised (e.g., clean) backup images for use in system restore operations. Thus, the APIs may be used to bring the system up to date (e.g., to the last recorded point before the ransomware attack) in a fast and secure manner. Additionally, by offloading the disconnected storage nodes to cloud storage, the security of air-gapped storage may be achieved without significantly increasing the memory footprint used by on-premises or network devices of the system.

It is noted that other types of devices and functionality may be provided according to aspects of the present disclosure and discussion of specific devices and functionality herein have been provided for purposes of illustration, rather than by way of limitation. It is noted that the operations of the method 400 of FIG. 4 and the method 800 of FIG. 8 may be performed in any order, or that one or more operations of the method 400 may be included in the method 800, or vice-versa. It is also noted that either or both of the method 400 of FIG. 4 and the method 800 of FIG. 8 may also include other functionality or operations consistent with the description of the operations of the system 100 of FIG. 1, the system 200 of FIG. 2, the system 500 of FIG. 5, the operations 600 of FIG. 6, or the system 700 of FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for providing secure backup and recovery of files during ransomware attacks or other cyberattacks, the method comprising:

storing, by one or more processors, received data at one or more storage nodes coupled via a network to create a data backup at the one or more storage nodes;

storing, by the one or more processors, duplicated images of the data backup as backup images at a disconnected storage node that is isolated from the network;

initiating, by the one or more processors, an alarm state to indicate detection of target activity including a plurality of sequences of activities, wherein the target activity is associated with a ransomware attack indicated by deviation in pattern of at least one application programming interface (API) call, and wherein the alarm state corresponds to the data backup;

issuing, by the one or more processors, one or more application programming interface API calls to the disconnected storage node after detection of the ransomware attack;

prohibiting, by the one or more processors, access to the data backup at the one or more storage nodes based on the alarm state;

initiating, by the one or more processors, storage of recovered data at one or more other storage nodes coupled via the network to create a second data backup at the one or more other storage nodes by building new edge nodes to restore a most recent backup image, the new edge nodes being an air gap cluster;

providing the most recent backup image to the new edge nodes;

receiving the most recent backup image from the disconnected storage node; and performing, by the one or more processors, one or more system recovery operations of a central system based on the recent backup image, wherein the new edge nodes are put into production based on the retrieved backup image to restore the central system.

2. The method of claim 1, further comprising detecting, by the one or more processors, the target activity based on monitoring API calls to store or retrieve data from the data backup, API calls to store or retrieve the backup images from the disconnected storage node, or a combination thereof.

3. The method of claim 2, wherein the target activity comprises an expired API call or a particular sequence of API calls that correspond to the ransomware attack.

4. The method of claim 1, further comprising prohibiting, by the one or more processors, access to the data backup at the one or more storage nodes based on the alarm state.

5. The method of claim 1, wherein the one or more API calls comprise industry standard API calls.

6. The method of claim 1, wherein the disconnected storage node comprises an on-premises storage node that is isolated from the network or a cloud-based storage node that is disconnected from the network.

7. The method of claim 1, further comprising:
receiving, by the one or more processors after receipt of the recent backup image, additional backup data from the disconnected storage node; and
performing, by the one or more processors, one or more additional system recovery operations based on the additional backup data.

8. The method of claim 1, further comprising:
generating, by the one or more processors, one or more logs of system activity during the alarm state; and
providing, by the one or more processors, the one or more logs for analysis after termination of the alarm state.

9. The method of claim 1, wherein the received data comprises electronic health record/electronic medical record (EHR/EMR) data.

10. The method of claim 1, wherein the most recent backup image includes read images and write images representing images of system information, files, or data read from the central system and images of system information, files, or data write by the central system for performing system backups of the central system.

11. A system for providing secure backup and recovery of files during ransomware attacks or other cyberattacks, the system comprising:
a memory; and
one or more processors communicatively coupled to the memory, the one or more processors configured to:
initiate storage of received data at one or more storage nodes coupled via a network to create a data backup at the one or more storage nodes;
initiate storage of duplicated images of the data backup as backup images at a disconnected storage node that is isolated from the network;
detect, target activity includes a plurality of sequences of activities, to initiate an alarm state corresponding to the data backup, wherein the target activity is associated with a ransomware attack indicated by deviation in pattern of at least one application programming interface (API) call;
issue one or more API calls to the disconnected storage node after detection of the ransomware attack;
prohibit, access to the data backup at the one or more storage nodes based on the alarm state, and
initiate, storage of recovered data at one or more other storage nodes coupled via the network to create a second data backup at the one or more other storage nodes by building new edge nodes to restore a most recent backup image, the new edge nodes being an air gap cluster;
provide, the most recent backup image to the new edge nodes; and
perform one or more system recovery operations of a central system based on the most recent backup image received from the disconnected storage node, wherein the new edge nodes are put into production based on the retrieved backup image to restore the central system.

12. The system of claim 11, wherein the one or more processors are further configured to detect the target activity based on monitored API calls to store or retrieve data from the data backup, monitored API calls to store or retrieve the backup images from the disconnected storage node, or a combination thereof.

13. The system of claim 12, wherein the target activity comprises an expired API call or a particular sequence of API calls that correspond to the ransomware attack.

14. The system of claim 11, wherein the one or more API calls comprise industry standard API calls.

15. The system of claim 11, wherein the disconnected storage node comprises an on-premises storage node that is isolated from the network or a cloud-based storage node that is disconnected from the network.

16. The system of claim 11, wherein the received data comprises electronic health record/electronic medical record (EHR/EMR) data.

17. A non-transitory computer-readable storage medium storing instructions that, when executed by one or more processors, cause the one or more processors to perform operations for providing secure backup and recovery of files during ransomware attacks or other cyberattacks, the operations comprising:
storing received data at one or more storage nodes coupled via a network to create a data backup at the one or more storage nodes;
storing duplicated images of the data backup as backup images at a disconnected storage node that is isolated from the network;
detecting, target activity including a plurality of sequences of activities, and initiating an alarm state corresponding to the data backup wherein the target activity is associated with a ransomware attack indicated by deviation in pattern of at least one application programming interface (API) call;

issuing one or more API calls to the disconnected storage node after detection of the ransomware attack;

prohibiting, access to the data backup at the one or more storage nodes based on the alarm state, and initiating, storage of recovered data at one or more other storage nodes coupled via the network to create a second data backup at the one or more other storage nodes by building new edge nodes to restore a most recent backup image, the new edge nodes being an air gap cluster;

providing the most recent backup image to the new edge nodes;

receiving from the disconnected storage node the most recent backup image; and performing one or more system recovery operations of a central system based on the recent backup image, wherein the new edge nodes are put into production based on the retrieved backup image to restore the central system.

18. The non-transitory computer-readable storage medium of claim 17, wherein the operations further comprise:

receiving, after receipt of the recent backup image, additional backup data from the disconnected storage node; and performing one or more additional system recovery operations based on the additional backup data.

19. The non-transitory computer-readable storage medium of claim 17, wherein the operations further comprise:

generating one or more logs of system activity during the alarm state; and providing the one or more logs for analysis after termination of the alarm state.

20. The non-transitory computer-readable storage medium of claim 17, wherein the most recent backup image includes read images and write images representing images of system information, files, or data read from the central system and images of system information, files, or data write by the central system for performing system backups of the central system.

* * * * *